United States Patent
Hori et al.

(10) Patent No.: US 11,789,249 B2
(45) Date of Patent: Oct. 17, 2023

(54) ZOOM LENS AND IMAGE PICKUP APPARATUS

(71) Applicant: CANON KABUSHIKI KAISHA, Tokyo (JP)

(72) Inventors: Masao Hori, Tochigi (JP); Kazuya Shimomura, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 131 days.

(21) Appl. No.: 17/574,088

(22) Filed: Jan. 12, 2022

(65) Prior Publication Data
US 2022/0269057 A1     Aug. 25, 2022

(30) Foreign Application Priority Data

Feb. 12, 2021   (JP) ................................ 2021-020779

(51) Int. Cl.
| | |
|---|---|
| *G02B 15/163* | (2006.01) |
| *G02B 13/00* | (2006.01) |
| *G02B 13/02* | (2006.01) |

(52) U.S. Cl.
CPC ......... *G02B 15/163* (2013.01); *G02B 13/009* (2013.01); *G02B 13/02* (2013.01)

(58) Field of Classification Search
CPC .... G02B 15/163; G02B 13/009; G02B 13/02; G02B 15/145125; G02B 15/1461
See application file for complete search history.

(56) References Cited

U.S. PATENT DOCUMENTS

| | | |
|---|---|---|
| 9,264,638 B2 | 2/2016 | Nakamura et al. |
| 9,268,120 B2 | 2/2016 | Shimomura et al. |
| 9,310,592 B2 | 4/2016 | Wakazono et al. |
| 9,329,372 B2 | 5/2016 | Shimomura |
| 9,400,374 B2 | 7/2016 | Yoshimi et al. |
| 9,678,318 B2 | 6/2017 | Nakamura et al. |

(Continued)

FOREIGN PATENT DOCUMENTS

| | | |
|---|---|---|
| JP | 2016-071140 A | 5/2016 |
| JP | 2016-173481 A | 9/2016 |
| JP | 2020-160262 A | 10/2020 |

OTHER PUBLICATIONS

Ex Parte Quayle Action issued by the United States Patent and Trademark Office in corresponding U.S. Appl. No. 17/574.108, dated Jun. 20, 2023, pp. 1-19.

*Primary Examiner* — Alicia M Harrington
(74) *Attorney, Agent, or Firm* — Carter, DeLuca & Farrell LLP

(57) ABSTRACT

A zoom lens includes, in order from an object side to an image side, a first lens unit having a positive refractive power, and a subsequent unit including a plurality of lens units, The first lens unit is configured not to move for zooming. A distance between each pair of adjacent lens units changes in zooming. The subsequent unit includes, in order from the image side to the object side, a lens having a positive refractive power and configured not to move for zooming, a moving positive lens unit consisting of one or two lenses, having a positive refractive power, and configured to move in zooming, and a diaphragm configured to move in zooming. The diaphragm is closer to the object side at the wide-angle end than at the telephoto end. A predetermined condition is satisfied.

14 Claims, 14 Drawing Sheets

(56) References Cited

U.S. PATENT DOCUMENTS

| | | |
|---|---|---|
| 9,716,829 B2 | 7/2017 | Shimomura |
| 9,904,043 B2 | 2/2018 | Shimomura et al. |
| 10,295,806 B2 | 5/2019 | Miyazawa et al. |
| 10,359,604 B2 | 7/2019 | Hori |
| 10,670,845 B2 | 6/2020 | Shimomura |
| 10,955,647 B2 | 3/2021 | Ogawa et al. |
| 11,137,586 B2 | 10/2021 | Shimomura et al. |
| 11,143,850 B2 | 10/2021 | Hori et al. |
| 2019/0265447 A1 | 8/2019 | Hori et al. |
| 2020/0348496 A1* | 11/2020 | Eguchi ............... G02B 13/009 |
| 2021/0048651 A1 | 2/2021 | Noda |
| 2021/0048655 A1 | 2/2021 | Shimomura |
| 2021/0109330 A1 | 4/2021 | Hori et al. |

* cited by examiner

ZOOM LENS AND IMAGE PICKUP APPARATUS

BACKGROUND OF THE INVENTION

Field of the Invention

The present invention relates to a zoom lens and an image pickup apparatus.

Description of the Related Art

One of the known zoom lenses having a wide angle of view and a high zoom ratio is a positive lead type zoom lens in which a first lens unit having a positive refractive power is disposed closest to the object. Japanese Patent Laid-Open No. ("JP") 2016-173481 discloses a zoom lens having a high zoom ratio of about 7 and including, in order from an object side to an image side, a first lens unit having a positive refractive power, second to fifth lens units configured to move during zooming (a magnification variation), and a sixth lens unit. The fifth lens unit includes a diaphragm (aperture stop). JP 2020-160262 discloses a zoom lens having a zoom ratio of about 3 as a zoom lens that can support a full-size image sensor mage pickup element) and has a wide angle of view, and this zoom lens includes, in order from the object side to the image side, a first lens unit having a positive refractive power, second to fourth lens units configured to move during zooming, and a fifth lens unit. The fourth lens unit includes a diaphragm.

In order to realize a high optical performance, a wide angle of view, and a small size in the positive lead type zoom lenses, it is important to properly set a diaphragm position and a focal length of each lens unit. For a wider angle of view; a lens diameter of the first lens unit, which is determined by a height of an off-axis ray at the wide-angle end, increases and the zoom lens becomes larger, or the focal length of the first lens unit needs to be short and thus it becomes difficult to achieve a good optical performance (imaging performance) from the central portion to the periphery.

In the zoom lens disclosed in JP 2016-173481, a moving amount of the lens unit including the diaphragm is small, and the lens diameter of the first lens unit increases when the angle of view is made wider. In the zoom lens disclosed in JP 2020-160262, the lens unit including the diaphragm includes three or more lenses, which is disadvantageous in achieving a bright aperture diameter ratio, a small size, and a light weight.

SUMMARY OF THE DISCLOSURE

An aspect of the disclosure provides, for example, a zoom lens beneficial in a wide angle of view, a small size and a light weight, and a high optical performance over an entire zoom range thereof.

A zoom lens according to the disclosure includes, in order from an object side to an image side, a first lens unit having a positive refractive power, and a subsequent unit including a plurality of lens units. The first lens unit is configured not to move for zooming. A distance between each pair of adjacent lens units changes in zooming. The subsequent unit includes, in order from the image side to the object side, a lens unit having a positive refractive power and configured not to move for zooming, a moving positive lens unit consisting of one or two lenses, having a positive refractive power, and configured to move in zooming, and a diaphragm configured to move in zooming. The diaphragm is closer to the object side at the wide-angle end than at the telephoto end. The following condition is satisfied:

$$0.01 \leq Lwt/Td \leq 0.25$$

where $Lwt$ is a distance on an optical axis between a position of the diaphragm at the wide-angle end and a position of the diaphragm at the telephoto end, and $Td$ is a distance on the optical axis from a surface closest to the object side of the zoom lens to an image plane of the zoom lens at the wide-angle end.

Further features of the present invention will become apparent from the following description of exemplary embodiments with reference to the attached drawings.

DESCRIPTION OF THE EMBODIMENTS

Figure 1:
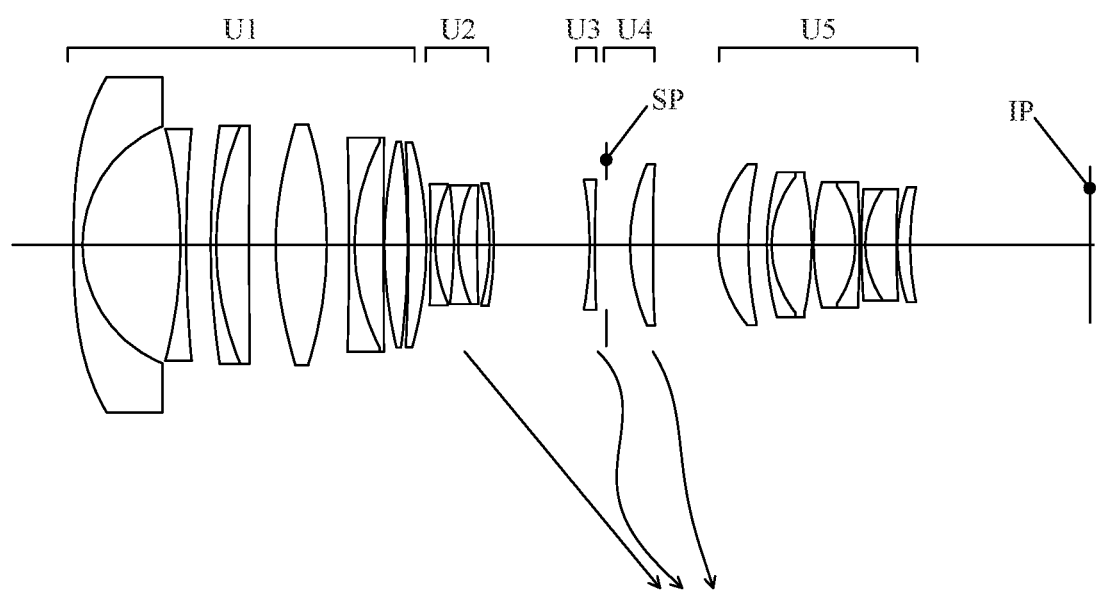
FIG. 1 is a sectional view of a zoom lens according to Example 1.

Referring now to the accompanying drawings, a description will be given of embodiments according to the present invention.

FIGS. 1, 4, 7, 10, 13, and 16 illustrate sections of zoom lenses according to examples 1 to 6 at a wide-angle end in an in-focus state on an object at infinity (infinity in-focus state hereinafter). The wide-angle end and the telephoto end correspond to zoom states with the maximum angle of view (shortest focal length) and the minimum angle of view (longest focal length) when the lens unit configured to move during zooming is located at both ends of a mechanically or controllably movable range on the optical axis, respectively. The zoom lens according to each example is used as an imaging optical system for a broadcasting television camera, a video camera, a digital still camera, and a film-based camera. In each figure, Un (n=1 to 6) denotes a lens unit, SP denotes an diaphragm (aperture stop), and IP denotes an image plane. An imaging plane of an image sensor (an image pickup element or a photoelectric conversion element) or a photosensitive plane of a silver halide film is disposed on the image plane IP.

Prior to specific explanations according to Examples 1 to 6, matters common to each example will be explained. In the zoom lens according to each example, in order to obtain a wide angle of view (overall angle of view $2\omega$ is about 54 to 100°), a zoom ratio (magnification variation ratio) of about 2 to 13, a small size, a light weight, and a high optical performance over the entire zoom range, a moving amount of the diaphragm relative to the overall length and a configuration of a lens unit that is moved during zooming are properly set.

The zoom lens according to each example includes, in order from the object side to the image side, a first lens unit (U1) having a positive refractive power, and a subsequent unit including a plurality of lens units (U2 to U5 or U6). The zoom lens according to each example is a positive lead type zoom lens in which a lens unit having a positive refractive power is disposed closest to the object.

The zoom lens according to each example provides zooming by changing a distance between adjacent lens units, The first lens unit does not move (is fixed or immobile) for zooming. The subsequent unit includes, in order from the image side to the object side, a final lens unit that has a positive refractive power and is not moved for zooming, a finally-moving positive lens unit that includes (consists of) one or two lenses, has a positive refractive power, is moved during zooming. in each example, one lens means a single lens, and a cemented lens in which two lenses are joined together is considered to be two lenses. This is because both the cemented lens and the two non-cemented lenses can exhibit similar chromatic aberration correcting effects.

The subsequent unit includes an diaphragm (SP) that is moved during zooming.

A focal length conversion optical system that includes an insertable or detachable lens unit, and converts a focal length of the entire zoom lens system may be disposed before and after the final lens unit. A driving mechanism may be provided that suppresses a focus movement during zooming in the entire zoom range by slightly moving the final lens unit along the optical axis wholly or partially.

In the zoom lens according to each example, the diaphragm is closer to the object at the wide-angle end than at the telephoto end. A condition expressed by the following expression (inequality) (1) is satisfied:

$$0.01 \leq Lwt/Td \leq 0.25 \tag{1}$$

where Lwt is a distance on the optical axis between the positions of the diaphragm at the wide-angle end and the position of the diaphragm at the telephoto end, and Td is a distance on the optical axis from the surface closest to the object in the first lens unit (that is, the zoom lens) at the wide-angle end to the image plane.

The distance Lwt corresponds to a moving amount of the diaphragm during zooming from the wide-angle end to the telephoto end when a direction in which the diaphragm is moved to the image side is set positive from the wide-angle end to the telephoto end. Even if the moving direction of the diaphragm changes during zooming, it is determined only by the position of the diaphragm at the wide-angle end and the position of the diaphragm at the telephoto end.

Figure 19:
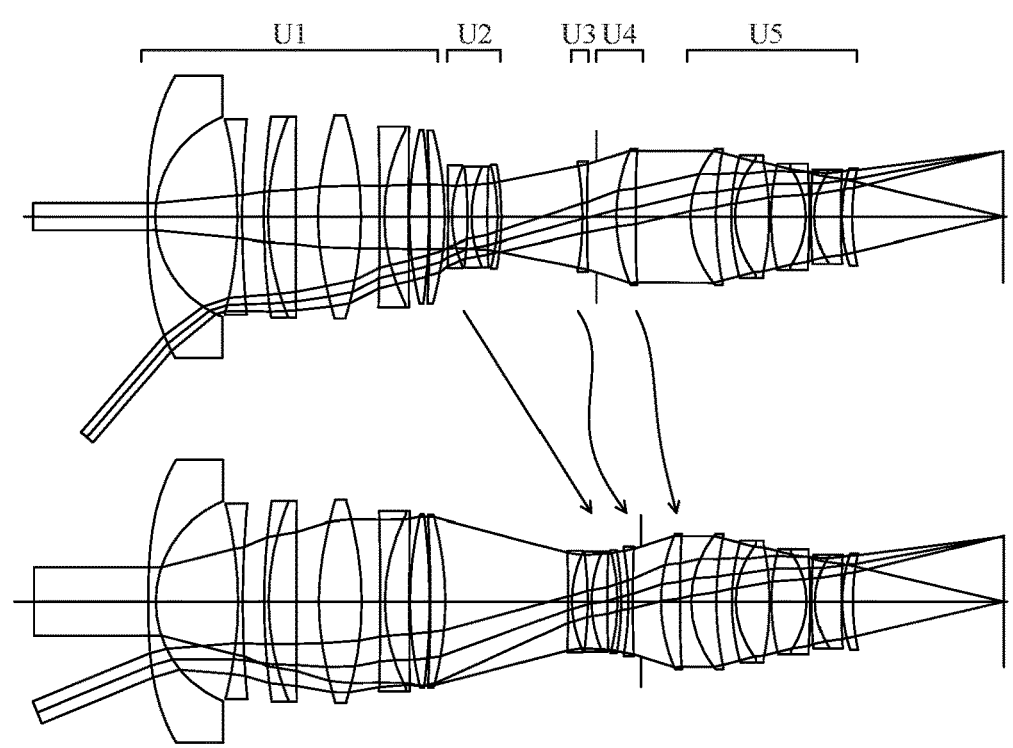
FIG. 19 illustrates optical paths of the zoom lens according to Example 1 at the wide-angle end and at the telephoto end.

A description will now be given of a relationship between the moving amount of the diaphragm and the first lens unit. Upper and lower figures in FIG. 19 illustrate optical paths of the zoom lens according to Example 1 (numerical example 1 described later) at the wide-angle end and at the telephoto end in the infinity in-focus state, respectively. As understood from these figures, a lens diameter of a lens closest to the object, which has the largest lens diameter in the first lens unit U1, is determined by the height of the off-axis ray at the wide-angle end in the infinity in-focus state. The wider the angle of view becomes, the larger the lens diameter of the lens closest to the object becomes. In each example, the diaphragm is made closer to the object at the wide-angle end than at the telephoto end, so that the entrance pupil of the zoom lens at the wide-angle end is made closer to (moved toward) the object than at the telephoto end, in order to suppress an increase in the lens diameter of the lens closest to the object along with a wider angle of view.

The expression (1) defines a condition regarding a relationship between the moving amount on the optical axis of the diaphragm placed in the subsequent unit during zooming from the telephoto end to the wide-angle end, and a distance on the optical axis (overall lens length) from the surface closest to the object to the image plane at the wide-angle end. When Lwt/Td satisfies the condition expressed in the expression (1), the zoom lens can be made small. If Lwt/Td is higher than the upper limit in the expression (1), a space necessary for zooming in the subsequent unit becomes long, and it becomes difficult to make small the zoom lens. If Lwt/Td is lower than the lower limit in the expression (1), the effect of moving the entrance pupil by the diaphragm at the wide-angle end toward the object side becomes small, and it becomes difficult to make small the zoom lens.

The numerical range of the expression (1) may be set as follows:

$$0.02 \leq Lwt/Td \leq 0.20 \tag{1a}$$

The numerical range of the expression (1) may be set as follows:

$$0.03 \leq Lwt/Td \leq 0.15 \tag{1b}$$

The numerical range of the expression (1) may be set as follows:

$$0.04 \leq Lwt/Td \leq 0.07 \tag{1c}$$

The zoom lens according to each example may satisfy at least one of the conditions expressed by the following expressions (2) to (13), in addition to the condition of the expression (1).

The subsequent unit in the zoom lens according to each example includes a finally-moving negative lens unit m2 that has a negative refractive power, includes (consists of) one or two lenses, and is moved during zooming, in addition to the final lens unit (designated by r hereinafter) and the finally-moving positive lens unit (designated by m1 hereinafter). The condition expressed by the following expression (2) may be satisfied:

$$-2.0\times10^{-3}\leq(\theta m1-\theta m2)/(vm2-vm1)\leq2.5\times10^{-3} \quad (2)$$

where vm1 is an average value of Abbe numbers based on the d-line of optical materials of all positive lenses included in the finally-moving positive lens unit m1, θm1 is an average value of partial dispersion ratios with respect to the g-line and the F-line, vm2 is an average value of Abbe numbers based on the d-line of optical materials of all negative lenses included in the finally-moving negative lens unit m2, and θm2 is an average value of partial dispersion ratios with respect to the g-line and the F-line.

The finally-moving positive lens unit m1 is adjacent to the final lens unit r, and the smaller (brighter) the aperture diameter ratio of the zoom lens becomes, the larger the lens diameter of the finally-moving positive lens unit m1 becomes. In order to reduce the size and weight of the lens unit that is moved during zooming, it is effective to reduce the number of lenses constituting this lens unit. In each example, the finally-moving positive lens unit m1 includes (consists of) one or two lenses. in addition, by arranging the finally-moving positive lens unit m1 and the finally-moving negative lens unit m2 close to each other and by correcting the chromatic aberration using the relationship of the characteristics of the glass materials between the moving lens units, the chromatic aberration can be satisfactorily corrected over the entire zoom range.

The Abbe number vd (vm1, vm2) based on the d-line of the optical material in the expression (2) and the partial dispersion ratio θgF (θm1, θm2) with respect to the g-line and F-line are expressed by the following expressions (a) and (b), respectively. In each expression, Ng, NF, Nd, and NC, respectively, are refractive indexes of the optical material for the g-line (wavelength 435.8 nm), the F-line (wavelength 486.1 nm), the d-line (wavelength 587.6 am), and the C-line (wavelength 656.3 nm) in the Fraunhofer lines:

$$vd=(Nd-1)/(NF-NC) \quad (a)$$

$$\theta gF=(Ng-NF)/(NF-NC) \quad (b)$$

Figure 20:
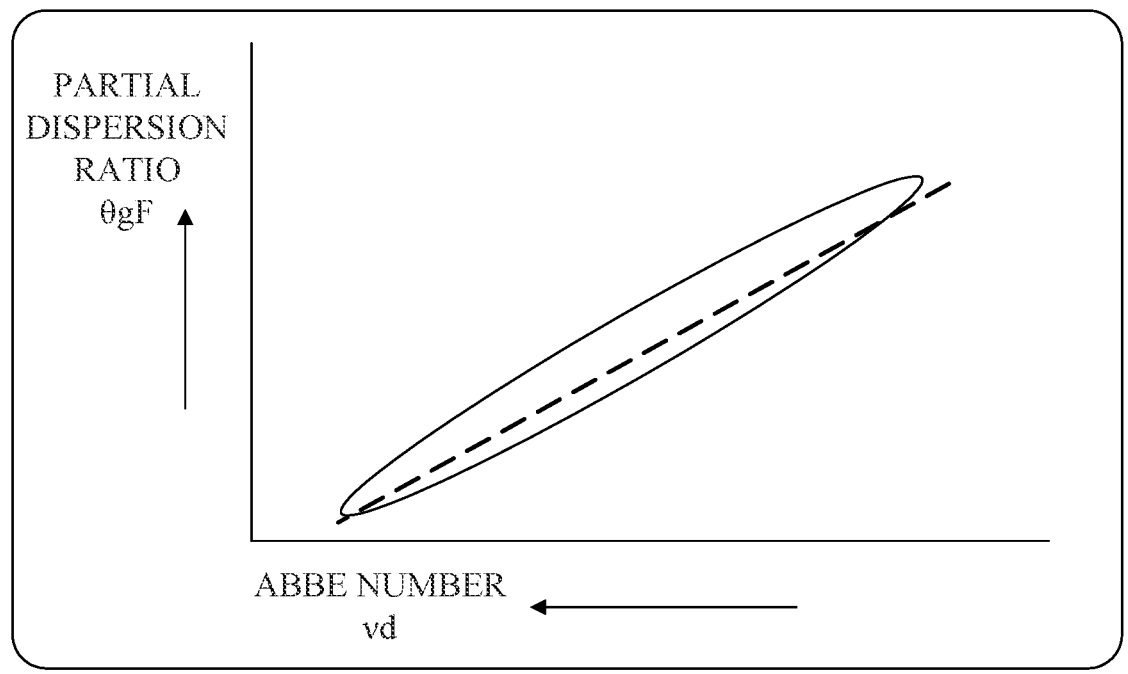
FIG. 20 is a graph illustrating a distribution of optical materials.

A description will now be given of a relationship regarding the chromatic aberration correction between the finally-moving positive lens unit m1 and the finally-moving negative lens unit m2. As illustrated in FIG. 20, the partial dispersion ratios θgF of the existing optical materials distribute in a narrow range against the Abbe number vd, and the smaller vd is, the larger the θgF tends to be larger. Assume that two lenses Gp and Gn have positive and negative refractive powers Φp and Φn and Abbe numbers vp and vn, respectively, h is an incident height of the on-axis paraxial ray on each lens, and H is an incident height of the pupil paraxial ray. Then, a longitudinal chromatic aberration coefficient L and a lateral chromatic aberration coefficient T in a thin close contact system including the lenses Gp and Gn are expressed by the following expressions (c) and (d):

$$L=h\times h\times(\Phi p/vp+\Phi n/vn) \quad (c)$$

$$T=h\times H\times(\Phi p/vp+\theta n/vn) \quad (d)$$

$$\Phi p+\Phi n=\Phi \quad (e)$$

The on-axis paraxial ray and the pupil paraxial ray are rays defined as follows, The on-axis paraxial ray is a paraxial ray incident on the zoom lens while the focal length of the entire zoom lens system at the wide-angle end is normalized to 1, and the incident height is set to 1 in parallel with the optical axis. The pupil paraxial ray is a paraxial ray that passes through an intersection of the entrance pupil of the zoom lens and the optical axis among light rays incident on the maximum image height of the imaging plane, while the focal length of the entire zoom lens system at the wide-angle end is normalized to 1.

The refractive power of each lens in the expressions (c) and (d) is normalized so that Φ=1 in the expression (e). This is similarly applied to three or more lenses. In the expressions (c) and (d), when L=0 and T=0, the imaging positions on the optical axis and the image plane coincide with each other between the C-line and the F-line. The chromatic aberration correction for two specific wavelengths in this way is generally called two-wavelength achromatism (primary spectrum correction). In particular, in a high-magnification zoom lens, the chromatic aberration of each lens unit, that is, L and T, is corrected to nearly 0 in order to suppress the chromatic aberration fluctuation along with zooming.

Assume that a secondary spectral amount Δs of the longitudinal chromatic aberration and a secondary spectral amount Δy of the lateral chromatic aberration are a shift amount of the longitudinal chromatic aberration of the g-line to the F-line and a shift amount of the lateral chromatic aberration of the g-line relative to the F-line, in the infinity-focused state, that is, the state where the light beam is incident on the zoom lens with the object distance at infinity, respectively. Then, they are expressed by the following expressions (f) and (g):

$$\Delta s=-h\times h\times(\theta p-\theta n)/(vp-vn)\times f \quad (f)$$

$$\Delta y=-h\times H\times(\theta p-\theta n)/(vp-vn)\times Y \quad (g)$$

where f is a focal length of the entire zoom lens system, and Y is an image height.

The chromatic aberration correction for three specific wavelengths by adding a specific wavelength to the above two wavelengths in this way is generally called three-wavelength achromatism (secondary spectrum correction).

Since the focal length f of the expression (f) increases as the zoom lens has a higher zoom ratio, it becomes difficult to reduce the secondary spectrum of longitudinal chromatic aberration. As the angle of view of the zoom lens is made wider, the pupil paraxial ray H in the expression (g) increases, and it becomes difficult to reduce the secondary spectrum of the lateral chromatic aberration at the wide-angle end. Each example particularly makes wider the angle of view of the zoom lens, and satisfactorily corrects the primary and secondary spectra of the lateral and longitudinal chromatic aberrations over the entire zoom range.

Satisfying the condition expressed in the expression (2) can provide proper differences in Abbe number and partial dispersion ratio between the finally-moving positive lens unit m1 and the finally-moving negative lens unit m2, and becomes advantageous in correcting the chromatic aberration over the entire zoom range. When (θm1−θm2)/(vm2−vm1) is higher than the upper limit or lower than the lower limit in the expression (2), it becomes difficult to provide the finally-moving positive lens unit m1 and the finally-moving negative lens unit m2 with proper chromatic aberration correcting powers. Moreover, it is difficult to achieve a good optical performance over the entire zoom range.

The numerical range of expression (2) may be set as follows:

$$-1.0\times10^{-3}\leq(\theta m1--\theta m2)/(vm2-vm1)\leq2.2\times10^{-3} \quad (2a)$$

The numerical range of expression (2) may be set as follows:

$$-0.5\times10^{-3} \leq (\theta m1-\theta m2)/(vm2-vm1) \leq 1.9\times10^{-3} \quad (2b)$$

The numerical range of expression (2) may be set as follows:

$$0 \leq (\theta m1-\theta m2)/(vm2-vm1) \leq 1.9\times10^{-3} \quad (2c)$$

The numerical range of expression (2) may be set as follows:

$$0.2\times10^{-3} \leq (\theta m1-\theta m2)/(vm2-vm1) \leq 1.5\times10^{-3} \quad (2d)$$

The numerical range of expression (2) may be set as follows:

$$0.5\times10^{-3} \leq (\theta m1-\theta m2)/(vm2-vm1) \leq 1.3\times10^{-3} \quad (2e)$$

The zoom lens according to each example may satisfy a condition expressed by the following expression (3):

$$0.01 \leq Dm12/fm1 \leq 0.50 \quad (3)$$

where Dm12 is a maximum air distance (spacing) between the finally-moving positive lens unit m1 and the finally-moving negative lens unit m2 in the entire zoom range from the wide-angle end to the telephoto end, and fm1 is a focal length of the finally-moving positive lens unit m1.

In the zoom lens according to each example, in order to reduce the weight of the finally-moving positive lens unit m1 and the finally-moving negative lens unit m2, it is unnecessary to correct the chromatic aberration by the positive lens and the negative lens in each lens unit. By properly selecting optical materials of the lenses in the finally-moving positive lens unit m1 and the finally-moving negative lens unit m2 adjacent to the finally-moving positive lens unit m1 and by correcting the chromatic aberration between the lens units, the chromatic aberration may be satisfactorily corrected in the entire zoom range. In the zoom lens according to each example, the aberration correction ability in the middle zoom range is improved by moving the finally-moving positive lens unit m1 and the finally-moving negative lens unit m2 so as to draw different moving loci during zooming. Since the chromatic aberration correction capability fluctuates at the same time, it is basically necessary for the finally-moving positive lens unit m1 and the finally-moving negative lens unit m2 to maintain a close relationship to each other in the entire zoom range.

The expression (3) defines a condition regarding a relationship between the maximum air spacing during zooming between the finally-moving positive lens unit m1 and the finally-moving negative lens unit m2 and the focal length fm1 of the finally-moving positive lens unit m1. By satisfying the condition expressed in the expression (3), the finally-moving positive lens unit m1 and the finally-moving negative lens unit m2 can be properly brought close to each other in the entire zoom range, and the chromatic aberration correction ability in the entire zoom range can be sufficiently restrained from fluctuating. When Dm12/fm1 is higher than the upper limit in the expression (3), the finally-moving positive lens unit m1 and the finally-moving negative lens unit m2 are separated from each other, and it becomes difficult to satisfactorily correct the chromatic aberration in the entire zoom range. When Dm12/fm1 is lower than the lower limit in the expression (3), the fluctuation of the distance between the finally-moving positive lens unit m1 and the finally-moving negative lens unit m2 is almost eliminated, and it is difficult to divide the lens unit to correct an aberration other than chromatic aberration.

The numerical range of the expression (3) may be set as follows:

$$0.02 \leq Dm12/fm1 \leq 0.45 \quad (3a)$$

The numerical range of the expression (3) may be set as follows:

$$0.03 \leq Dm12/fm1 \leq 0.40 \quad (3b)$$

The numerical range of the expression (3) may be set as follows:

$$0.04 \leq Dm12/fm1 \leq 0.35 \quad (3c)$$

The numerical range of the expression (3) may be set as follows:

$$0.05 \leq Dm12/fm1 \leq 0.30 \quad (3d)$$

The zoom lens according to each example may satisfy a condition expressed by the following expression (4):

$$-5.0 \leq fm2/fm1 \leq -0.7 \quad (4)$$

where fm1 is a focal length of the finally-moving positive lens unit m1, and fm2 is a focal length of the finally-moving negative lens unit m2.

Satisfying the conditional expressed in the expression (4) can make smaller the zoom lens. If fm2/fm1 is higher than the upper limit in the expression (4), the refractive power of the finally-moving negative lens unit m2 becomes strong, the lens diameter of the subsequent unit becomes large, and it becomes difficult to make smaller the zoom lens. If fm2/fm1 is lower than the lower limit in the expression (4), the refractive power of the finally-moving negative lens unit m2 becomes weak, the moving amount of the finally-moving negative lens unit m2 during zooming becomes large, and it becomes difficult to make smaller the zoom lens.

The numerical range of the expression (4) may be set as follows:

$$-4.7 \leq fm2/fm1 \leq -0.8 \quad (4a)$$

The numerical range of the expression (4) may be set as follows:

$$-3.2 \leq fm2/fm1 \leq -0.9 \quad (4b)$$

The numerical range of the expression (4) may be set as follows:

$$-2.4 \leq fm2/fm1 \leq -1.0 \quad (4c)$$

In the zoom lens according to each example, the finally-moving positive lens unit m1 includes (consists of) a single positive lens, and the conditions expressed by the following expressions (5) and (6) may be satisfied:

$$28 \leq vm1u \leq 60 \quad (5)$$

$$0.540 \leq \theta m1u \leq 0.600 \quad (6)$$

where vm1u is an Abbe number based on the d-line of the optical material of the single positive lens, and θm1u is a partial dispersion ratio of the optical material of the single positive lens with respect to the g-line and the F-line.

Satisfying the expressions (5) and (6) can make smaller the zoom lens and provide a high optical performance. The expressions (5) and (6) define conditions relating to ranges of the dispersion (Abbe number) and the partial dispersion ratio which are advantageous in correcting the lateral chromatic aberration that tends to increase at a wider angle of view when the finally-moving positive lens unit m1 includes (consists of) a single positive lens. If vm1u is lower than the lower limit in the expression (5) or θm1u is higher than the upper limit in the expression (6), the positive lens using the existing optical material has an excessively high dispersion and an excessively high partial dispersion ratio, and it becomes difficult to achieve a satisfactory optical performance in the entire zoom range. If vm1u is higher than the upper limit in expression (5) or θm1u is lower than the lower limit in expression (6), the positive lens has an excessively high partial dispersion ratio, and it becomes difficult to achieve a satisfactory optical performance in the entire zoom range.

The numerical ranges of the expressions (5) and (6) may be set as follows:

$$29 \le vm1u \le 59 \tag{5a}$$

$$0.542 \le \theta m1u \le 0.595 \tag{6a}$$

The numerical ranges of the expressions (5) and (6) may be set as follows:

$$31 \le vm1u \le 56 \tag{5b}$$

$$0.543 \le \theta m1u \le 0.590 \tag{6b}$$

The numerical ranges of the expressions (5) and (6) may be set as follows:

$$33 \le vm1u \le 50 \tag{5c}$$

$$0.550 \le \theta m1u \le 0.585 \tag{6c}$$

The zoom lens according to each example may satisfy conditions expressed by the following expressions (7) and (8) when the finally-moving negative lens unit m2 includes (consists of) a single negative lens:

$$60 \le vm2u \le 110 \tag{7}$$

$$0.520 \le \theta m2u \le 0.550 \tag{8}$$

where vm2u is an Abbe number based on the d-line of the optical material of the single negative lens, and θm2u is a partial dispersion ratio of the optical material of the single negative lens with respect to the g-line and the F-line.

Satisfying the conditions of expressions (7) and (8) can make smaller the zoom lens and provide a high optical performance. The expressions (7) and (8) define conditions under which a proper chromatic aberration correction relationship can be established with the finally-moving positive lens unit m1 when the finally-moving negative lens unit m2 includes (consists of) a single negative lens. Satisfying these conditions is advantageous in correcting the lateral chromatic aberration that particularly tends to increase at a wider angle of view. If vm2u is lower than the lower limit in the expression (7), the primary chromatic aberration caused by the movement of the finally-moving negative lens unit m2 along with zooming significantly fluctuates, and it becomes difficult to achieve a good optical performance in the entire zoom range. If θm2u is higher than the upper limit in the expression (8), the secondary chromatic aberration caused by the movement of the finally-moving negative lens unit m2 along with zooming significantly fluctuates, and it becomes difficult to achieve a good optical performance in the entire zoom range. If vm2u is higher than the upper limit in the expression (7), or if θm2u is lower than the lower limit in the expression (8), it becomes difficult to select a glass material.

The numerical ranges of the expressions (7) and (8) may be set as follows:

$$63 \le vm2u \le 107 \tag{7a}$$

$$0.522 \le \theta m2u \le 0.545 \tag{8a}$$

The numerical ranges of the expressions (7) and (8) may be set as follows:

$$70 \le vm2u \le 102 \tag{7b}$$

$$0.524 \le \theta m2u \le 0.543 \tag{8b}$$

The numerical ranges of the expressions (7) and (8) may be set as follows:

$$74 \le vm2u \le 97 \tag{7c}$$

$$0.526 \le \theta m2u \le 0.540 \tag{8c}$$

The numerical ranges of the expressions (7) and (8) may be set as follows:

$$80 \le vm2u \le 95 \tag{7d}$$

$$0.528 \le \theta mu2 \le 0.538 \tag{8d}$$

The zoom lens according to each example may satisfy the condition expressed by the following expression (9):

$$|1/\beta m1| \le 0.2 \tag{9}$$

where βm1 is a lateral magnification of the finally-moving positive lens unit m1 at the wide-angle end in the infinity in-focus state.

Satisfying the condition of the expression (9) can bring the light ray emitted from the finally-moving positive lens unit m1 close to parallel to reduce the change is higher than the upper limit in the expression (9), the emitted light beam from the finally moving positive lens unit m1 has an angle, the aperture diameter significantly changes during zooming, and the control mechanism becomes complicated.

The numerical range of the expression (9) may be set as follows:

$$|1/\beta m1| \le 0.15 \tag{9a}$$

The numerical range of the expression (9) may be set as follows:

$$|1/\beta m1| \le 0.13 \tag{9b}$$

The numerical range of the expression (9) may be set as follows:

$$|1/\beta m1 \le 0.11 \tag{9c}$$

The numerical range of the expression (9) may be set as follows:

$$|1/\beta m1 \le 0.04 \tag{9d}$$

The one or two n-th moving lens units configured to move during zooming in the subsequent unit of the zoom lens according to each example includes a lens unit having a negative refractive power (negative lens unit). Then, the conditions expressed by the following expressions (10) and (11) may be satisfied:

$$-5.0 \le f1/fn \le -0.8 \tag{10}$$

$$-2.5 \le fm1/fn \le -1.2 \tag{11}$$

where fn is a combined focal length of the one or two n-th moving lens units in the infinity in-focus state at the wide-angle end, and f1 is a focal length of the first lens unit.

The expressions (10) and (11) define conditions regarding the power arrangement of the lens units for a further miniaturization and a higher performance of the zoom lens. The focal length of the zoom lens is a product value of the focal length of the first lens unit and the lateral magnification of the lens units in the subsequent unit. In order to achieve a wide angle of view, it is necessary to properly set the focal length of the first lens unit. If f1/fn is higher than the upper limit in the expression (10), the refractive power of the first lens unit becomes strong and it becomes difficult to correct the aberration fluctuation. In addition, since the refractive power of the n-th moving lens unit is insufficient for the first lens unit, it is disadvantageous in reducing the size and weight of the zoom lens. If f1/fn is lower than the lower limit in the expression (10), the refractive power of the first lens unit is insufficient, and it becomes difficult to widen the angle of view and reduce the size and weight.

The numerical range of the expression (10) may be set as follows:

$$-4.0 \leq f1/fn \leq -0.9 \tag{10a}$$

The numerical range of the expression (10) may be set as follows:

$$-3.5 \leq f1/fn \leq -1.0 \tag{10b}$$

The numerical range of the expression (10) may be set as follows:

$$-3.0 \leq f1/fn \leq -1.3 \tag{10c}$$

Satisfying the condition expressed in the expression (11) can make smaller the zoom lens. If fm1/fn is higher than the upper limit in the expression (11), the refractive power of the negative lens unit in the subsequent unit becomes weak, the moving amount of the negative lens unit during zooming becomes large, and it becomes difficult to make small the zoom lens. If fm1/fn is lower than the lower limit in the expression (11), the refractive power of the positive lens unit in the subsequent unit becomes weak, the lens diameter of the subsequent unit becomes large, and it becomes difficult to make small the zoom lens.

The numerical range of the expression (11) may be set as follows:

$$-2.4 \leq fm1/fn \leq -1.3 \tag{11a}$$

The numerical range of the expression (11) may be set as follows:

$$-2.3 \leq fm1/fn \leq -1.4 \tag{11b}$$

The numerical range of the expression (11) may be set as follows:

$$-2.1 \leq fm1/fn \leq -1.5 \tag{11c}$$

The zoom lens according to each example may satisfy a condition expressed by the following expression (12):

$$0.6 \leq (\beta tn/\beta wn)/Zwt \leq 4.0 \tag{12}$$

where $\beta nw$ and $\beta nt$ are lateral magnifications of the n-th moving lens unit at the wide-angle end and at the telephoto end, respectively, and Zwt is a zoom ratio from the wide-angle end to the telephoto end of the entire zoom lens system.

The condition of the expression (12) defines a condition regarding a share of the n-th moving lens unit in a zoom ratio from the wide-angle end to the telephoto end of the zoom lens. Satisfying the condition expressed in the expression (12) can establish a proper zoom share, and is further advantageous for the miniaturization and high performance of the zoom lens. If $(\beta tn/\beta wn)/Zwt$ is higher than the upper limit in the expression (12), the share of the n-th moving lens unit in the zoom ratio is too lame, and it is difficult to suppress the aberration fluctuation along with the movement of the n-th lens unit. If $(\beta tn/\beta wn)/Zwt$ is lower than the lower limit in the expression (12), the zoom share of the lens unit after the n-th moving lens unit increases, which has a relatively simple configuration, and the high performance becomes difficult.

The numerical range of the expression (12) may be set as follows:

$$0.7 \leq (\beta tn/\beta wn)/Zwt \leq 3.1 \tag{12a}$$

The numerical range of the expression (12) may be set as follows:

$$0.8 \leq (\beta tn/\beta wn)/Zwt \leq 2.0 \tag{12b}$$

The numerical range of the expression (12) may be set as follows:

$$0.9 \leq (\beta tn/\beta wn)/Zwt \leq 1.4 \tag{12c}$$

The numerical range of the expression (12) may be set as follows:

$$0.9 \leq (\beta tn/\beta wn)/Zwt \leq 1.2. \tag{12d}$$

The zoom lens according to each example may satisfy a condition expressed by the following expression (13):

$$-1.0 \times 10^{-3} \leq (\theta np - \theta nn)/(vnn - vnp) \leq 3.0 \times 10^{-3} \tag{13}$$

where vnp and vnn are average values of Abbe numbers based on the d-line of optical materials of all positive lenses and all negative lenses included in the negative lens unit included in the n-th moving lens unit, respectively, and θnp and θnn are average values of partial dispersion ratios of the optical materials with respect to the 2-line and the F-line, respectively.

Satisfying the condition of the expression (13) can provide a difference in each of the Abbe number and partial dispersion ratio which is advantageous in correcting the lateral chromatic aberration in the negative lens unit, which particularly tends to increase at a wider angle of view: If $(\theta np - \theta nn)/(vnn - vnp)$ is higher than the upper limit in the expression (13), the chromatic aberration correction in the negative lens unit becomes insufficient, and it becomes difficult to achieve a good optical performance.

The numerical range of the expression (13) may be set as follows:

$$-0.5 \times 10^{-3} \leq (\theta np - \theta nn)/(vnn - vnp) \leq 2.7 \times 10^{-3} \tag{13a}$$

The numerical range of the expression (13) may be set as follows:

$$0 \leq (\theta np - \theta nn)/(vnn - vnp) \leq 2.5 \times 10^{-3} \tag{13b}$$

The numerical range of the expression (13) may be set as follows:

$$0 \leq (\theta np - \theta nn)/(vnn - vnp) \leq 2.4 \times 10^{-3} \tag{13c}$$

The numerical range of the expression (13) may be set as follows:

$$0.5 \times 10^{-3} \leq (\theta np - \theta nn)/(vnn - vnp) \leq 2.2 \times 10^{-3} \tag{13d}$$

The numerical range of the expression (13) may be set as follows:

$$1.0 \times 10^{-3} \leq (\theta np - \theta nn)/(vnn - vnp) \leq 2.1 \times 10^{-3} \tag{13e}$$

A description will now be given of Examples 1 to 6 and numerical examples 1 to 6 corresponding to them.

EXAMPLE 1

A zoom lens according to Example 1 (numerical example 1) illustrated in FIG. 1 includes, on a side closest to the object, a first lens unit U1 that has a positive refractive power, is not moved for zooming, and is moved for focusing. This zoom lens further includes the subsequent unit that includes, in order from the object side to the image side, a second lens unit U2 having a negative refractive power that is moved toward the image side for zooming from the wide-angle end to the telephoto end, and a third lens unit U3 having a negative refractive power and a fourth lens unit U4 having a positive refractive power, which are moved during zooming, respectively. The fourth lens unit U4 is moved non-linearly on the optical axis in association with the movements of the second lens unit U2 and the third lens unit U3 in order to correct the image plane fluctuation during zooming. The subsequent unit further includes a fifth lens unit U5 that is disposed closest to the image plane, has a positive refractive power, and is not moved for zooming.

In this example, the second lens unit U2 corresponds to the n-th moving lens unit, the third lens unit U3 corresponds to the finally-moving negative lens unit m2, the fourth lens unit U4 corresponds to the finally-moving positive lens unit m1, and the fifth lens unit U5 corresponds to the final lens unit r. The diaphragm SP is included in the fourth lens unit U4, and is closest to the object in the fourth lens unit U4.

In the numerical example 1, a surface number i denotes the order of the surfaces counted from the object side. r denotes a radius of curvature (mm) of an i-th surface counted from the object side, d denotes a lens thickness or air spacing (mm) on the optical axis between an i-th surface and an (i+1)-th surface, and nd denotes a refractive index of an optical material between an i-th surface and an (i+1)-th surface for the d-line. vd is an Abbe number based on the d-line of the optical material between an i-th surface and an (i+1)-th surface. θgF denotes a partial dispersion ratio with respect to the g-line and the F-line of the optical material between an i-th surface and an (i+1)-th surface, Numerical example 1 also illustrates the effective diameter (mm) and focal length (mm) of each surface.

BF denotes a backfocus (mm). The backfocus is a distance on the optical axis from the final surface of the zoom lens (the lens surface closest to the image plane) to the paraxial image plane and is converted into an air equivalent length. The overall lens length is a length obtained by adding the backfocus to the distance on the optical axis from the frontmost surface (lens surface closest to the object) to the final surface in the zoom lens, and the overall lens length al the wide-angle end corresponds to the distance Td illustrated in the expression (1).

An asterisk "*" attached to a surface number means that the surface has an aspherical shape. The aspherical shape is expressed as follows:

$$X = \frac{H^2/R}{1 + \sqrt{1-(1+k)(H/R)^2}} + A4H^4 + A6H^6 + A8H^8 + A10H^{10} + A12H^{12} + A14H^{14} + A16H^{16} + A3H^3 + A5H^5 + A7H^7 + A9H^9 + A11H^{11} + A13H^{13} + A15H^{15}$$

where an X-axis is set to an optical axis direction, an H-axis is set to a direction orthogonal to the optical axis, a light traveling direction is set positive, R is a paraxial radius of curvature, k is a conical constant, and A3 to A16 are aspherical coefficients. "e-z" means "×10$^{-z}$."

The description regarding this numerical example is similarly applied to other numerical examples described later.

In numerical example 1, the first lens unit U1 corresponds to first to sixteenth surfaces. The second lens unit U2 corresponds to seventeenth to twenty-third surfaces. The third lens unit U3 corresponds to twenty-fourth and twenty-fifth surfaces. The fourth lens unit U4 corresponds to twenty-sixth to twenty-eighth surfaces. The fifth lens unit U5 corresponds to twenty-ninth to forty-first surfaces.

The first lens unit U1 includes a first lens subunit (first to seventh surface) that has a negative refractive power and is not moved for focusing, a second lens subunit (eighth and ninth surfaces) that has a positive refractive power, and is moved to the image side during focusing from the infinity object to the short-distance object, and a third lens subunit (tenth to sixteenth surfaces) that has a positive refractive power and is not moved for focusing, In numerical example 1. the maximum air spacing mD12 between the third lens unit U3 and the fourth lens unit U4 is a distance obtained at a focal length of 35 mm.

Figure 2A:
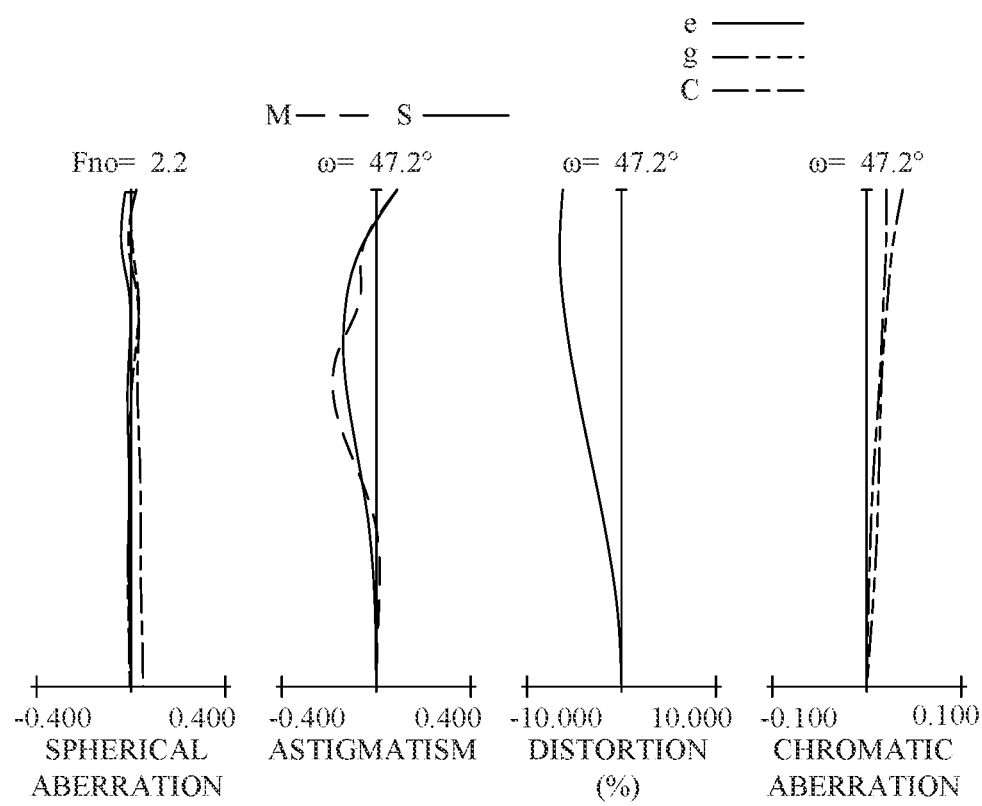
FIGS. 2A and 2B are aberration diagrams of the zoom lens according to Example 1 at a wide-angle end and at a middle zoom position, respectively.
Figure 2B:
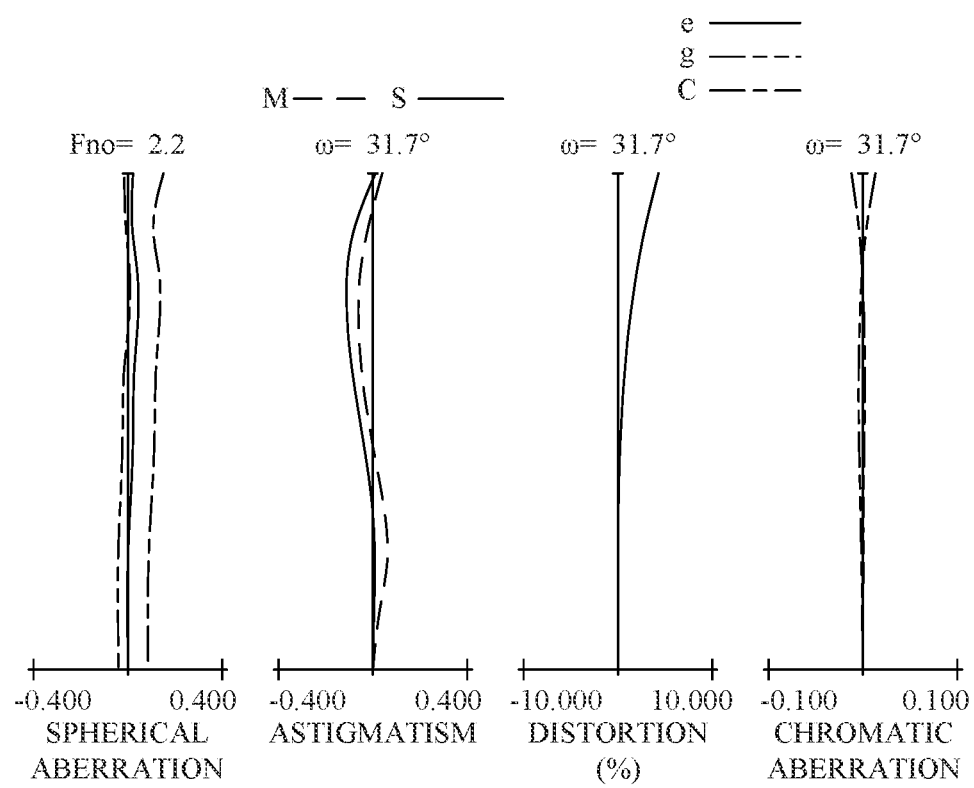
Figure 3:
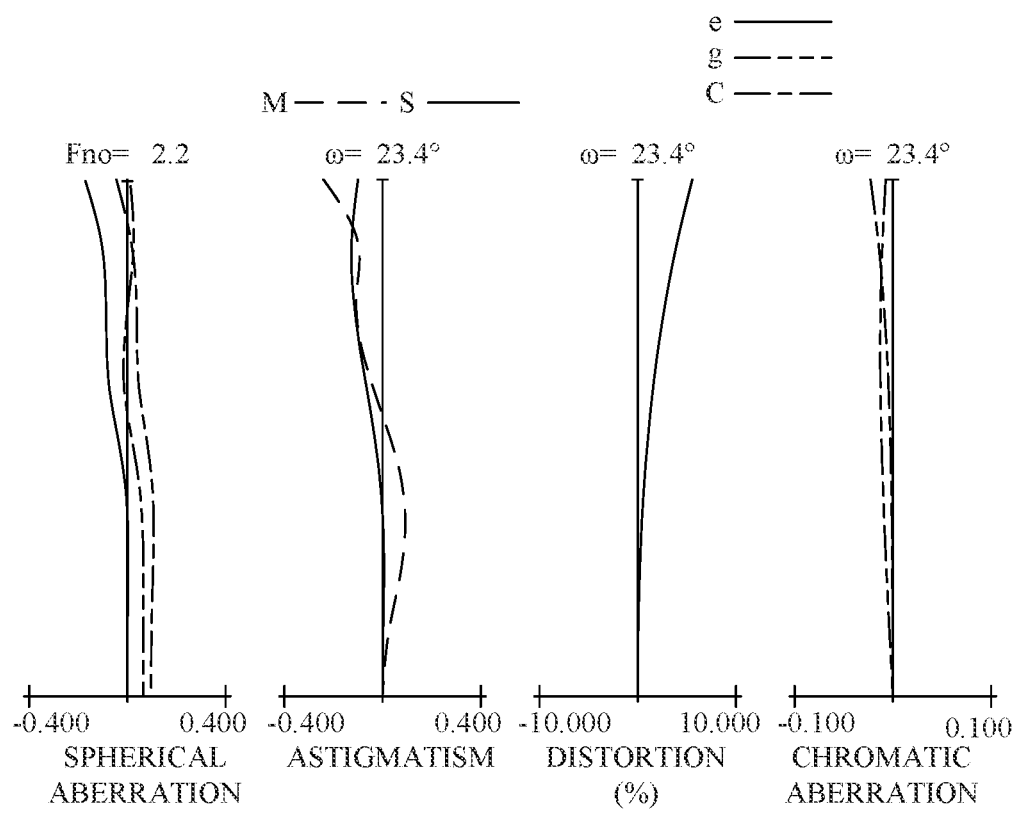
FIG. 3 is an aberration diagram of the zoom lens according to Example 1 at a telephoto end.

FIGS. 2A and 2B illustrate longitudinal aberrations (spherical aberration, astigmatism, distortion, and chromatic aberration) of the zoom lens according to Example 1 (numerical example 1) at the wide-angle end and at the middle zoom position (focal length 35 mm) in the infinity in-focus state, respectively. FIG. 3 illustrates a longitudinal aberration of the zoom lens according to Example 1 at the telephoto end in the infinity in-focus state. In each spherical aberration diagram, Fno denotes an F-number, and a solid line, an alternate long and two short dashes line, and an alternate long and short dash line denote spherical aberrations for the c-line (wavelength 546.1 nm), the g-line, and the C-line, respectively. In the astigmatism diagram, w denotes a half angle of view (°), a solid line S denotes a sagittal image plane, and a broken line M denotes a meridional image plane. The distortion diagram is illustrated for the g-line. In the chromatic aberration diagram, an alternate long and two short dashes line, and an alternate long and short dash line denote lateral chromatic aberrations for the g-line and the C-line, respectively. The spherical aberration is illustrated on a scale of ±0.400 mm, the astigmatism is illustrated on a scale of ±0.400 mm, the distortion is illustrated on a scale of ±10.000%, and the lateral chromatic aberration is illustrated on a scale of ±0.100 mm. The description of the longitudinal aberration diagrams is similarly applied to the longitudinal aberration diagrams in other examples described later.

Table 1 summarizes the values of the conditions expressed in the expressions (1) to (13) in Example 1 (numerical example 1). The zoom lens according to Example 1 satisfies each condition, and has a small size, a light weight, a wide angle of view, and a high optical performance in the entire zoom range. In particular, in this example, the third lens unit U3 includes (consists of) a single negative lens and the fourth lens unit U4 includes (consists of) a single positive lens, so that the zoom lens has a wide angle of view, a small size, a light weight, a bright aperture diameter ratio, and a high optical performance.

EXAMPLE 2

Figure 4:
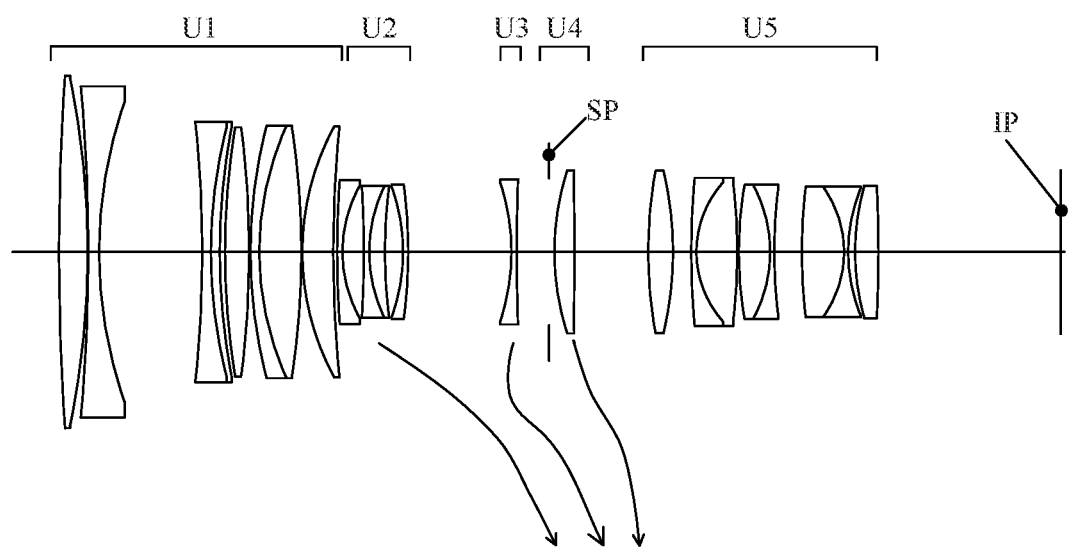
FIG. 4 is a sectional view of a zoom lens according to Example 2.

A zoom lens according to Example 2 (numerical example 2) illustrated in FIG. 4 includes, on a side closest to the object, a first lens unit U1 that has a positive refractive power, is not moved for zooming, and is moved for focusing. This zoom lens further includes the subsequent unit that includes, in order from the object side to the image side, a second lens unit U2 that has a negative refractive power and is moved toward the image side for zooming from the wide-angle end to the telephoto end, and a third lens unit U3 having a negative refractive power and a fourth lens unit U4 having a positive refractive power, which are moved during zooming, respectively. The fourth lens unit U4 is moved non-linearly on the optical axis in association with the movements of the second lens unit U2 and the third lens unit U3 in order to correct the image plane fluctuation during zooming. The subsequent unit further includes a fifth lens unit U5 that is disposed closest to the image plane, has a positive refractive power, and is not moved for zooming.

In this example, the second lens unit U2 corresponds to the n-th moving lens unit, the third lens unit U3 corresponds to the finally-moving negative lens unit m2, the fourth lens unit U4 corresponds to the finally-moving positive lens unit m1, and the fifth lens unit. U5 corresponds to the final lens unit r. The diaphragm SP is included in the fourth lens unit U4, and is closest to the object in the fourth lens unit U4.

In numerical example 2, the first lens unit U1 corresponds to first to fourteenth surfaces. The second lens unit U2 corresponds to fifteenth to twenty-first surfaces. The third lens unit U3 corresponds to twenty-second and twenty-third surfaces. The fourth lens unit U4 corresponds to twenty-fourth to twenty-sixth surfaces. The fifth lens unit U5 corresponds to twenty-seventh to thirty-ninth surfaces.

The first lens unit U1 includes a first lens subunit (first to fourth surfaces) that has a negative refractive power and is not moved for focusing, a second lens subunit (fifth to seventh surfaces) that has a negative refractive power and is moved to the image side during focusing from the infinity object to the short-distance object, and a third lens subunit (eighth to fourteenth surfaces) that has a positive refractive power and is not moved for focusing. In numerical example 2, the maximum air spacing mD12 between the third lens unit U3 and the fourth lens unit U4 is a distance obtained at a focal length of 67 mm.

Figure 5A:
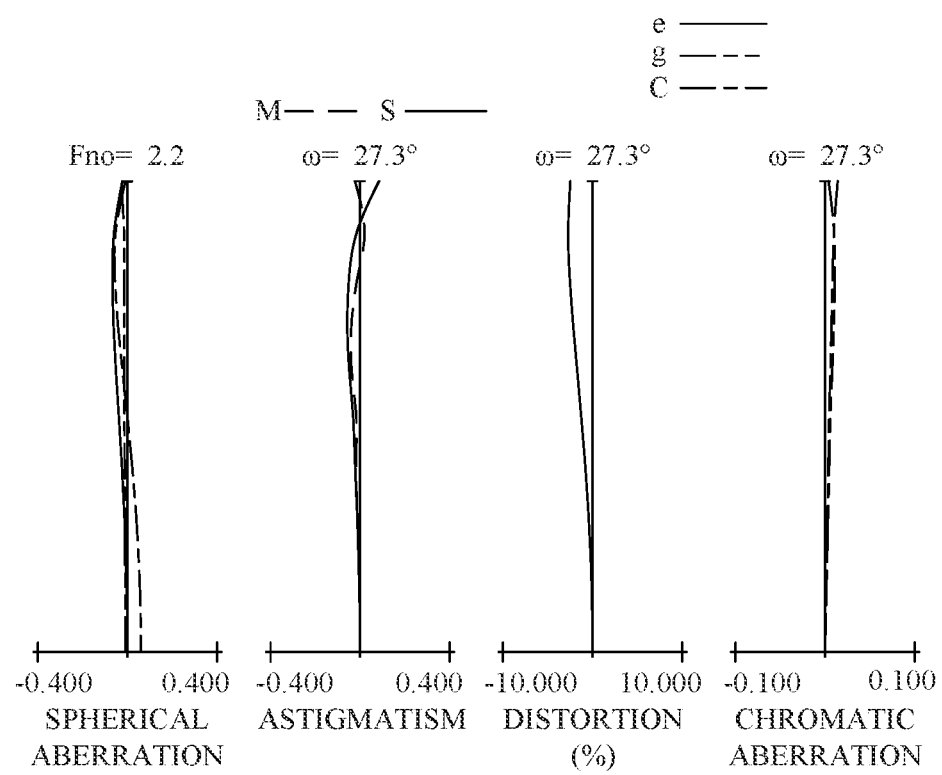
FIGS. 5A and 5B are aberration diagrams of the zoom lens according to Example 2 at a wide-angle end and at a middle zoom position, respectively.
Figure 5B:
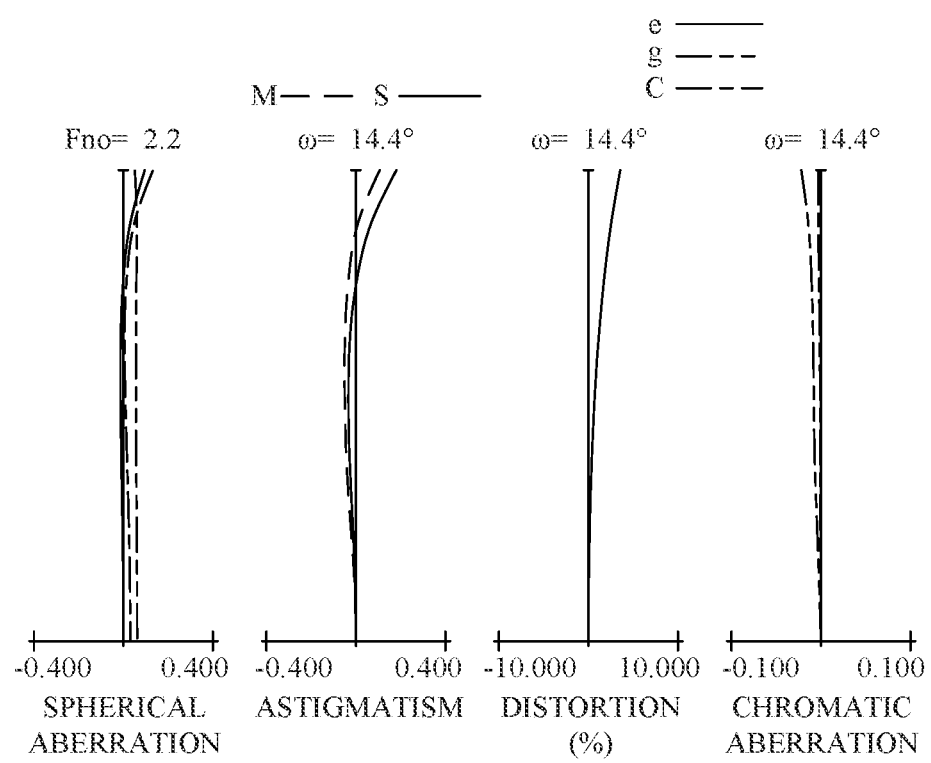
Figure 6:
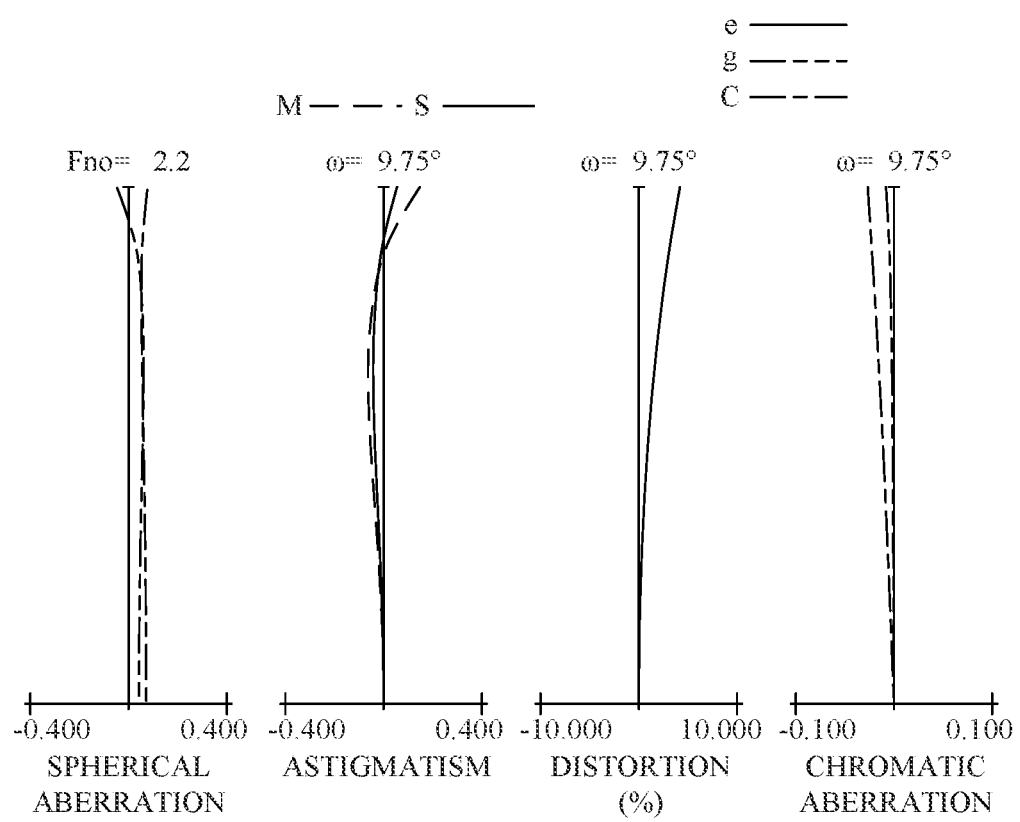
FIG. 6 is an aberration diagram of the zoom lens according to Example 2 at a telephoto end.

FIGS. 5A and 5B illustrate longitudinal aberrations of the zoom lens according to Example 2 (numerical example 2) at the wide-angle end and at the middle zoom position (focal length 90 mm) in the infinity-focused state, respectively. FIG. 6 illustrates a longitudinal aberration of the zoom lens according to Example 2 at the telephoto end in the infinity in-focus state.

Table 1 summarizes the values of the conditions expressed in the expressions (1) to (13) in Example 2 (numerical example 2). The zoom lens according to Example 2 satisfies each condition, and has a small size, a light weight, a wide angle of view, and a high optical performance in the entire zoom range. In particular, in this example, the third lens unit U3 includes (consists of) a single negative lens and the fourth lens unit U4 includes (consists of) a single positive lens, so that the zoom lens has a wide angle of view, a small size, a light weight, a bright aperture diameter ratio, and a high optical performance.

EXAMPLE 3

Figure 7:
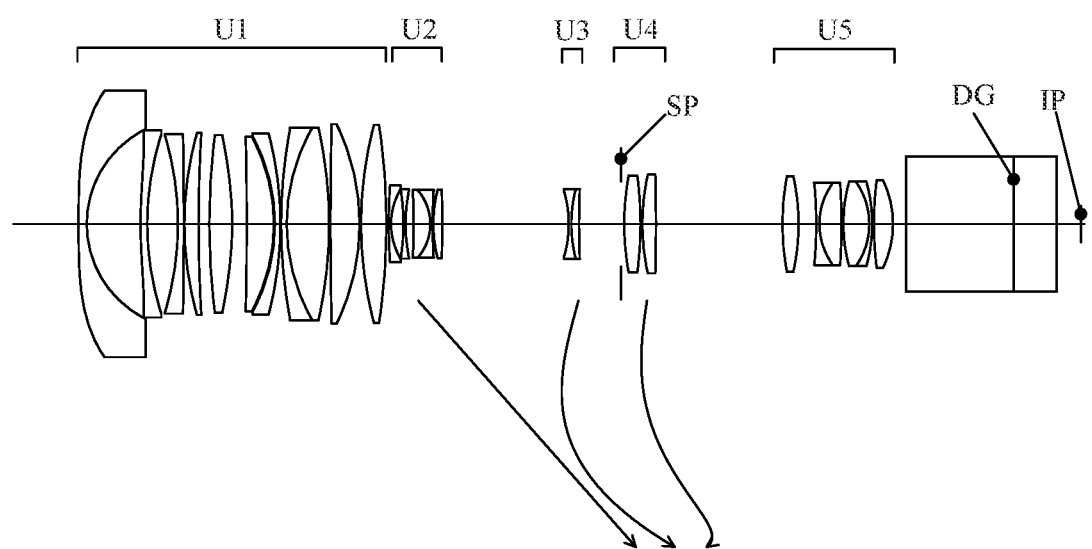
FIG. 7 is a sectional view of a zoom lens according to Example 3.

A zoom lens according to Example 3 (numerical example 3) illustrated in FIG. 7 includes, on a side closest to the object, a first lens unit U1 that has a positive refractive power, is not moved for zooming, and is moved for focusing. This zoom lens further includes the subsequent unit that includes, in order from the object side to the image side, a second lens unit U2 that has a negative refractive power and is moved toward the image side fir zooming from the wide-angle end to the telephoto end, and a third lens unit U3 that has a negative refractive power and a fourth lens unit U4 having a positive refractive power, which are moved during zooming, respectively. The fourth lens unit U4 is moved non-linearly on the optical axis in association with the movements of the second lens unit U2 and the third lens unit U3 in order to correct the image plane fluctuation during zooming. The subsequent unit further includes a fifth lens unit U5 that is disposed closest to the image plane, has a positive refractive power, and is not moved for zooming. DG denotes a dummy glass corresponding to a color separating optical system included in an image pickup apparatus.

In this example, the second lens unit U2 corresponds to the n-th moving lens unit, the third lens unit U3 corresponds to the finally-moving negative lens unit m2, the fourth lens unit U4 corresponds to the finally-moving positive lens unit m1, and the fifth lens unit U5 corresponds to the final lens unit r. The diaphragm SP is included in the fourth lens unit U4, and is closest to the object in the fourth lens unit U4.

In numerical example 3, the first lens unit U1 corresponds to first to twenty-first surfaces. The second lens unit U2 corresponds to twenty-second to thirtieth surfaces. The third lens unit U3 corresponds to thirty-first to thirty-third surfaces.

The fourth lens unit U4 corresponds to thirty-fourth to thirty-eighth surfaces. The fifth lens unit U5 corresponds to thirty-ninth to forty-eighth surfaces. The dummy glass DG corresponds to the forty-ninth to fifty-first surfaces.

The first lens unit U1 includes a first lens subunit (first to eighth surfaces) that has a negative refractive power and is not moved for focusing, a second lens subunit (ninth and tenth surfaces) that has a negative refractive power and is moved to the image side during focusing from the infinity object to the short-distance object, and a third lens subunit (eleventh to twenty-first surfaces) that has a positive refractive power and is not moved during focusing. In numerical example 3, the maximum air spacing mD12 between the third lens unit U3 and the fourth lens unit U4 is a distance obtained at a focal length of 16 mm.

Figure 8A:
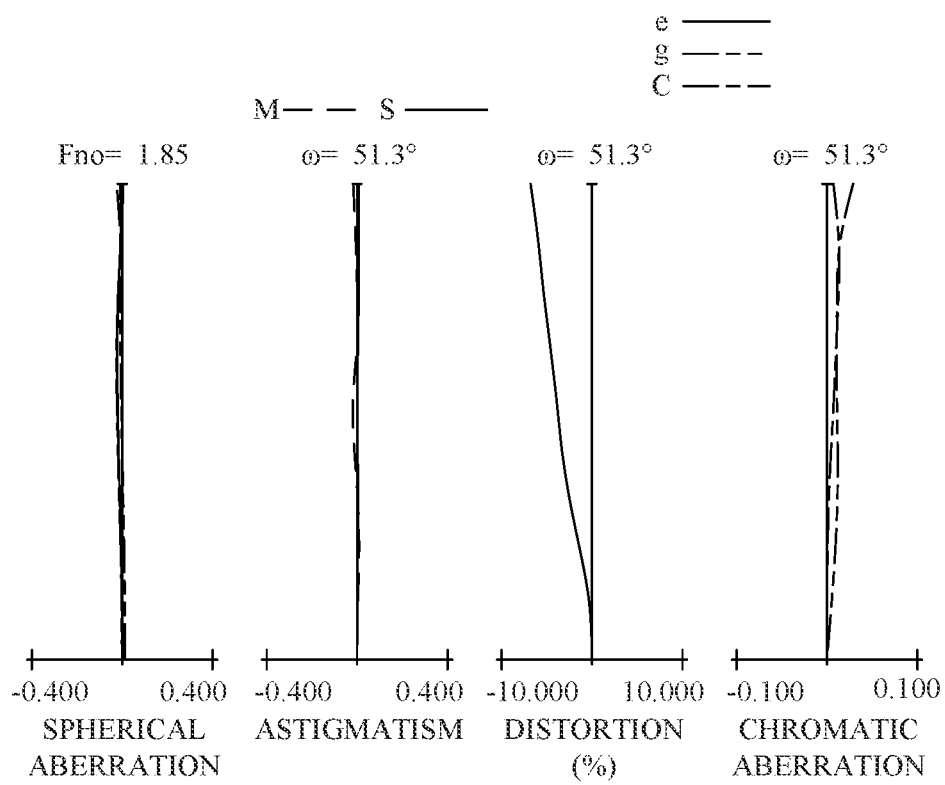
FIGS. 8A and 8B are aberration diagram of the zoom lens according to Example 3 at a wide-angle end and at a middle zoom position, respectively.
Figure 8B:
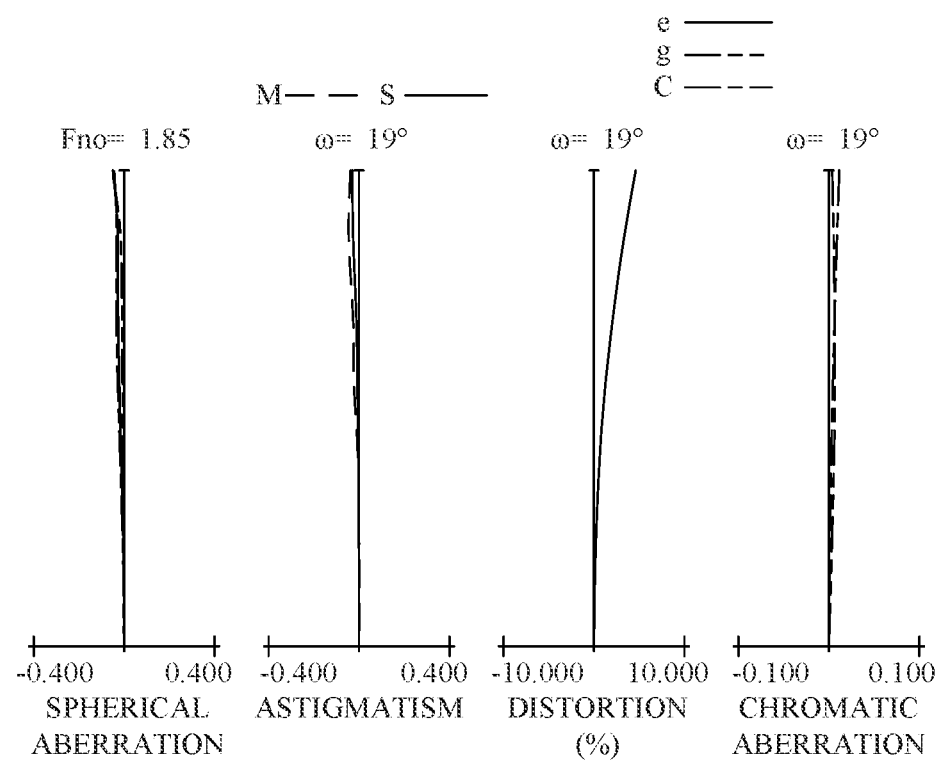
Figure 9:
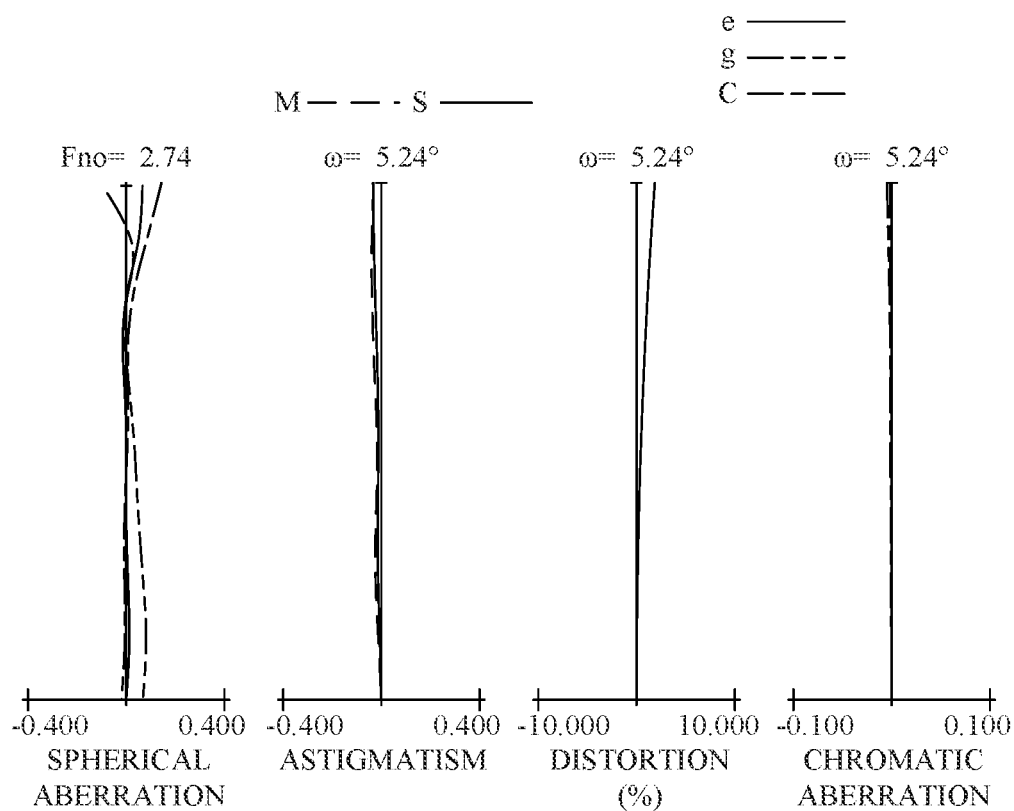
FIG. 9 is an aberration diagram of the zoom lens according to Example 3 at a telephoto end.

FIGS. 8A and 8B illustrate longitudinal aberrations of the zoom lens according to example 3 (numerical example 3) at the wide-angle end and at the middle zoom position (focal length 16 mm) in the infinity-focused state, respectively. FIG. 9 illustrates a longitudinal aberration of the zoom lens according to Example 3 at the telephoto end in the infinity in-focus state.

Table 1 summarizes the values of the conditions expressed in the expressions (1) to (13) in Example 3 (numerical example 3). The zoom lens according to Example 3 satisfies each condition, and has a small size, a light weight, a wide angle of view, and a high optical performance in the entire zoom range. In particular, in this example, the third lens unit U3 includes (consists of) two lenses or a single negative lens and a single positive lens, and the fourth lens unit U4 includes (consists of) two positive lenses, so that the zoom lens has a wide angle of view, a small size, a light weight, a bright aperture diameter ratio, and a high optical performance.

EXAMPLE 4

Figure 10:
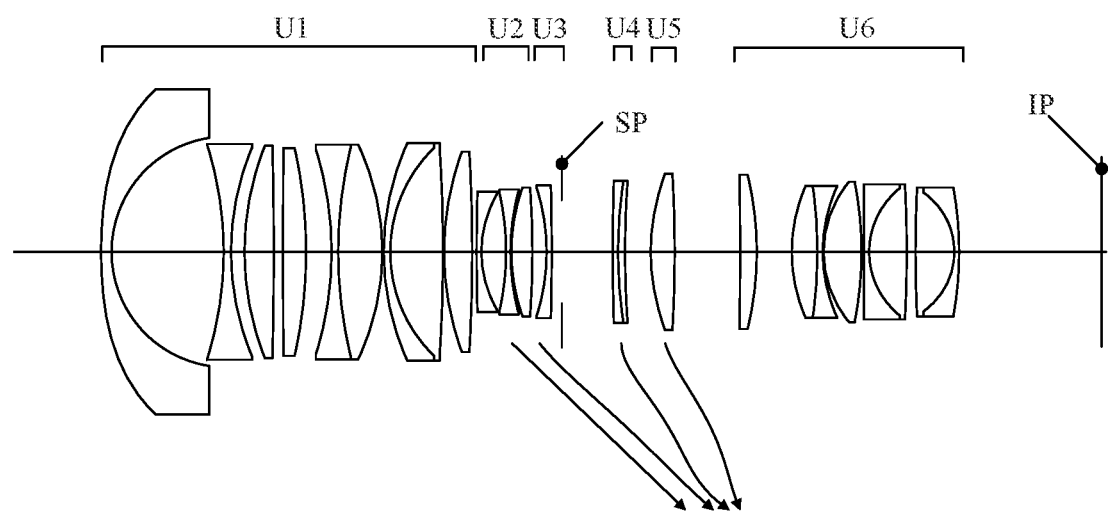
FIG. 10 is a sectional view of a zoom lens according to Example 4.

A zoom lens according to Example 4 (numerical example 4) illustrated in FIG. 10 includes, on a side closest to the object, a first lens unit U1 that has a positive refractive power, is not moved for zooming, and is moved for focusing. This zoom lens further includes the subsequent unit that includes, in order from the object side to the image side, a second lens unit U2 that has a negative refractive power and is moved toward the image side for zooming from the wide-angle end to the telephoto end, and a third lens unit U3 having a negative refractive power, a fourth lens unit U4 having a negative refractive power, and a fifth lens unit U5 having a positive refractive power, which are moved for zooming, respectively. The fifth lens unit U5 is moved non-linearly on the optical axis in association with the movements of the second lens unit U2, the third lens unit U3, and the fourth lens unit U4 in order to correct the image plane fluctuation during zooming. The subsequent unit further includes a sixth lens unit U6 that is disposed closest to the image plane, has a positive refractive power, and is not moved for zooming.

In this example, the second lens unit U2 and the third lens unit U3 correspond to the n-th moving lens unit, the fourth lens unit U4 corresponds to the finally-moving negative lens unit m2, the fifth lens unit U5 corresponds to the finally-moving positive lens unit m1, and the sixth lens unit U6 corresponds to the final lens unit r. The diaphragm SP is included in the third lens unit U3, and is closest to the image plane in the third lens unit U3.

In numerical example 4, the first lens unit U1 corresponds to first to sixteenth surfaces. The second lens unit U2 corresponds to seventeenth to twenty-second surfaces. The third lens unit U3 corresponds to twenty-third to twenty-fifth surfaces. The fourth lens unit U4 corresponds to twenty-sixth to twenty-eighth surfaces. The fifth lens unit U5 corresponds to twenty-ninth and thirtieth surfaces. The sixth lens unit U6 corresponds to thirty-first to forty-third surfaces, The first lens unit U1 includes a first lens subunit (first to sixth surfaces) that has a negative refractive power and is not moved for focusing, a second lens subunit (seventh and eighth surfaces) that has a negative refractive power and is moved to the image side during focusing from the infinity object to the short-distance object, and a third lens subunit (ninth to sixteenth surfaces) having a positive refractive power that is not moved during focusing. In numerical example 4, the maximum air spacing mD12 between the fourth lens unit U4 and the fifth lens unit U5 is a distance obtained at a focal length of 22.6 mm.

Figure 11A:
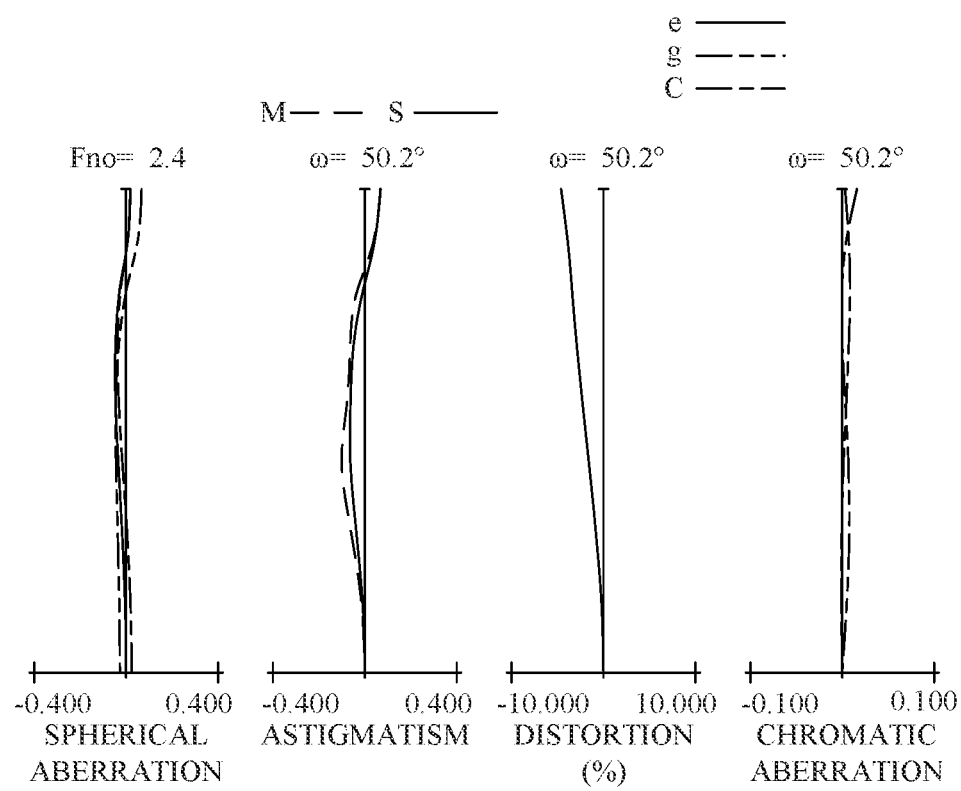
FIGS. 11A and 11B are aberration diagrams of the zoom lens according to example 4 at a wide-angle end and at a middle zoom position, respectively.
Figure 11B:
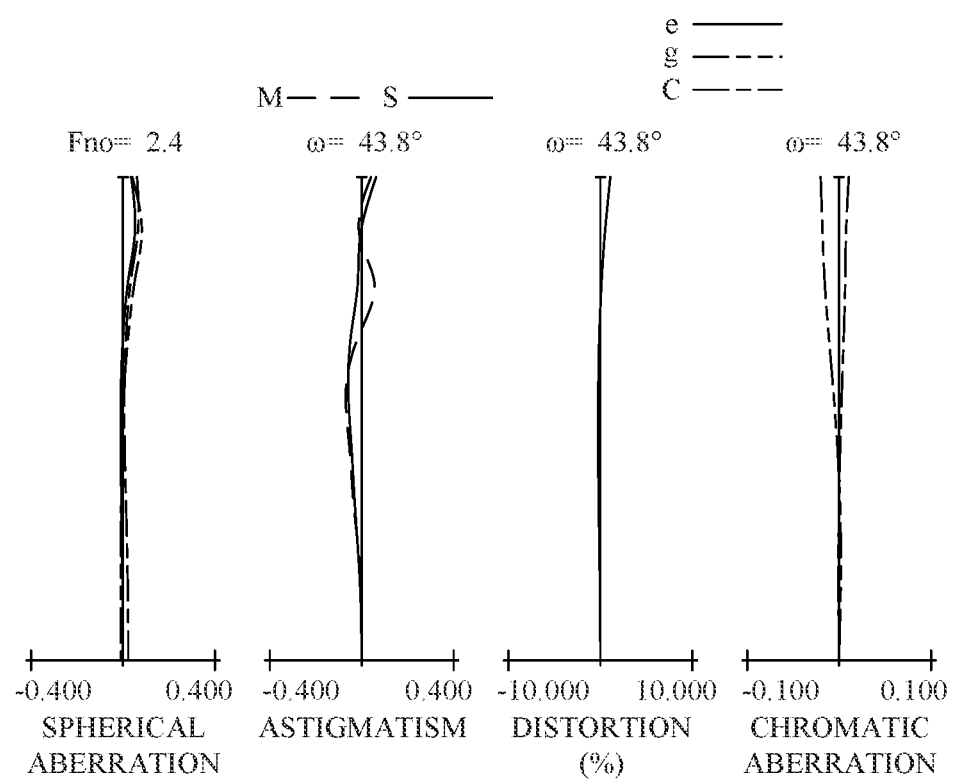
Figure 12:
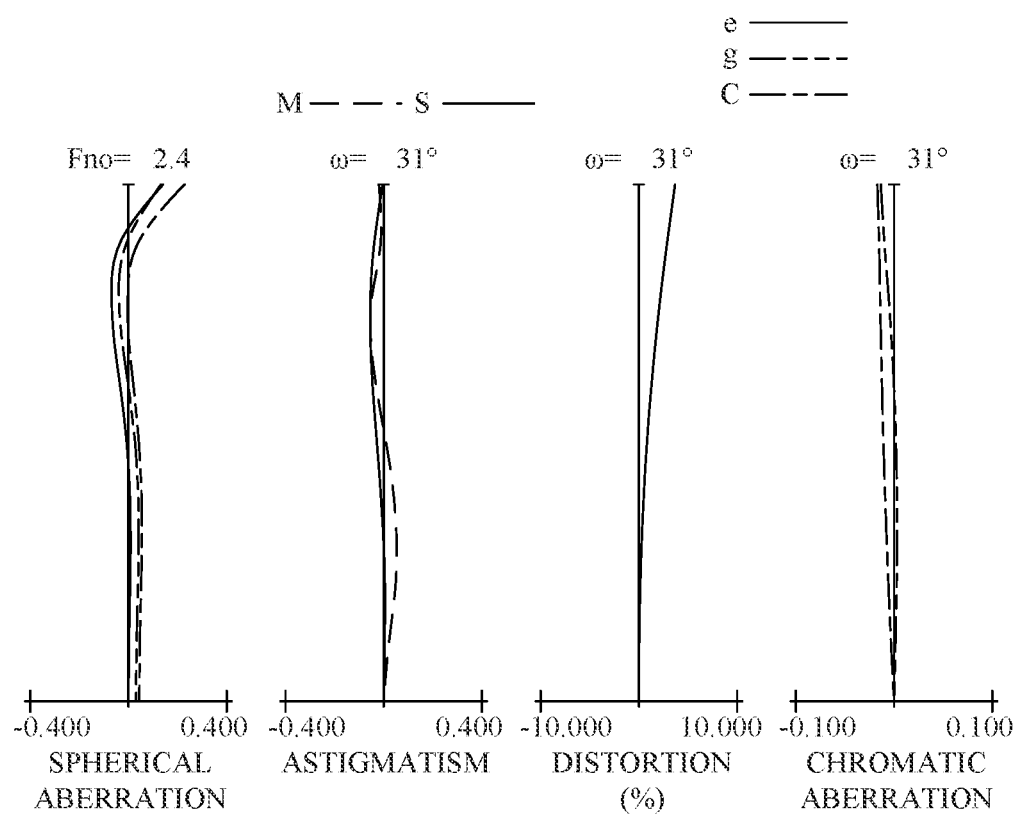
FIG. 12 is an aberration diagram of the zoom lens according to Example 4 at a telephoto end.

FIGS. 11A and 11B illustrate longitudinal aberrations of the zoom lens according to Example 4 (numerical example 4) at the wide-angle end and at the middle zoom position (focal length 22.6 mm) in the infinity-focused state, respectively. FIG. 12 illustrates a longitudinal aberration of the zoom lens according to Example 4 at the telephoto end in the infinity in-focus state, Table 1 summarizes the values of the conditions expressed in the expressions (1) to (13) in Example 4 (numerical example 4). The zoom lens according to Example 4 satisfies each condition, and has a small size, a light weight, a wide angle of view; and a high optical performance in the entire zoom range. In particular, in this example, the third lens unit U3 includes (consists of) two lenses or a single negative lens and a single positive lens, and the fourth lens unit U4 includes (consists of) a single positive lens, so that the zoom lens has a wide angle of view a small size, a light weight, a bright aperture diameter ratio, and a high optical performance.

EXAMPLE 5

Figure 13:
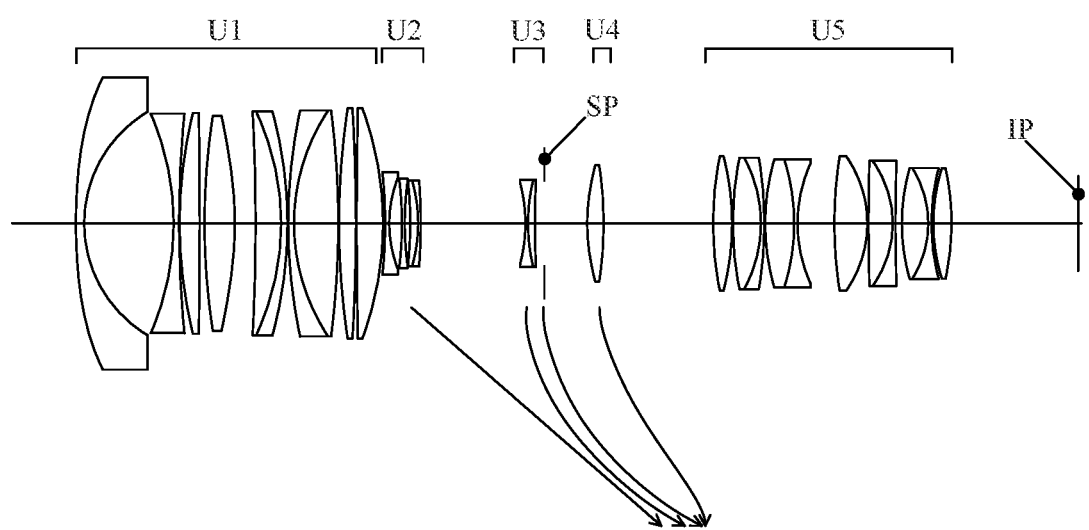
FIG. 13 is a sectional view of a zoom lens according to Example 5.

A zoom lens according to Example 5 (numerical example 5) illustrated in FIG. 13 includes, on a side closest to the object, a first lens unit U1 that has a positive refractive power, is not moved for zooming, and is moved for focusing. This zoom lens further includes the subsequent unit that includes, in order from the object side to the image side, a second lens unit U2 that has a negative refractive power and is moved toward the image side for zooming from the wide-angle end to the telephoto end, and a third lens unit U3 having a negative refractive power and a fourth lens unit U4 having a positive refractive power, which are moved for zooming, respectively. The fourth lens unit U4 is moved non-linearly on the optical axis in association with the movements of the second lens unit U2 and the third lens unit U3 in order to correct the image plane fluctuation during zooming. The subsequent unit further includes a fifth lens unit U5 that is disposed closest to the image plane, has a positive refractive power, and is not moved for zooming.

In this example, the second lens unit U2 corresponds to the n-th moving lens unit, the third lens unit U3 corresponds to the finally-moving negative lens unit m2, the fourth lens unit U4 corresponds to the finally-moving positive lens unit m1, and the fifth lens unit. U5 corresponds to the final lens unit r. The diaphragm SP is disposed between the third lens unit U3 and the fourth lens unit U4, and is moved independently of these lens units during zooming.

In numerical example 5, the first lens unit U1 corresponds to first to eighteenth surfaces. The second lens unit U2 corresponds to nineteenth to twenty-fifth surfaces. The third lens unit U3 corresponds to twenty-sixth and twenty-eighth surfaces. The diaphragm SP corresponds to a twenty-ninth surface. The fourth lens unit U4 corresponds to thirtieth and thirty-first surfaces. The fifth lens unit US corresponds to thirty-second to forty-eighth surfaces.

The first lens unit U1 includes a first lens subunit (first to sixth surfaces) that has a negative refractive power and is not moved for focusing, a second lens subunit (seven and eighth surfaces) that has a negative refractive power and is moved to the image side during focusing from the infinity object to the short-distance object, and a third lens subunit (ninth to eighteenth surfaces) that has a positive refractive power and is not moved during focusing. In numerical example 5, the maximum air spacing mD12 between the third lens unit U3 and the fourth lens unit U4 is a distance obtained at a focal length of 28.5 mm.

Figure 14A:
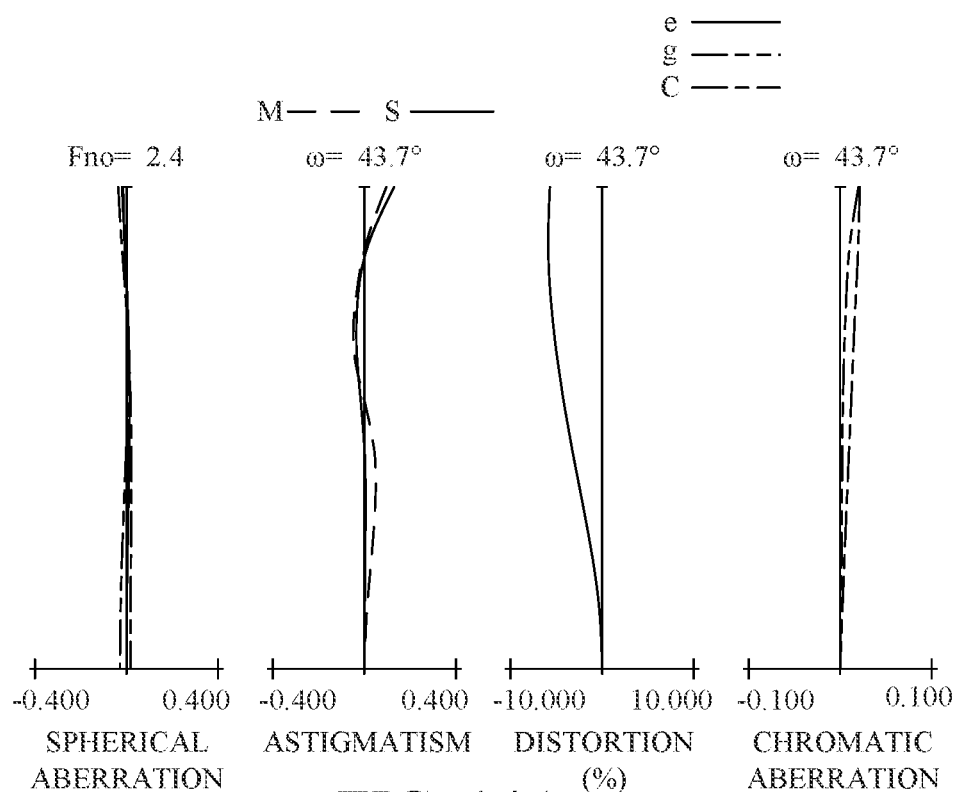
FIGS. 14A and 14B are aberration diagrams of the zoom lens according, to Example 5 at a wide-angle end and at a middle zoom position, respectively.
Figure 14B:
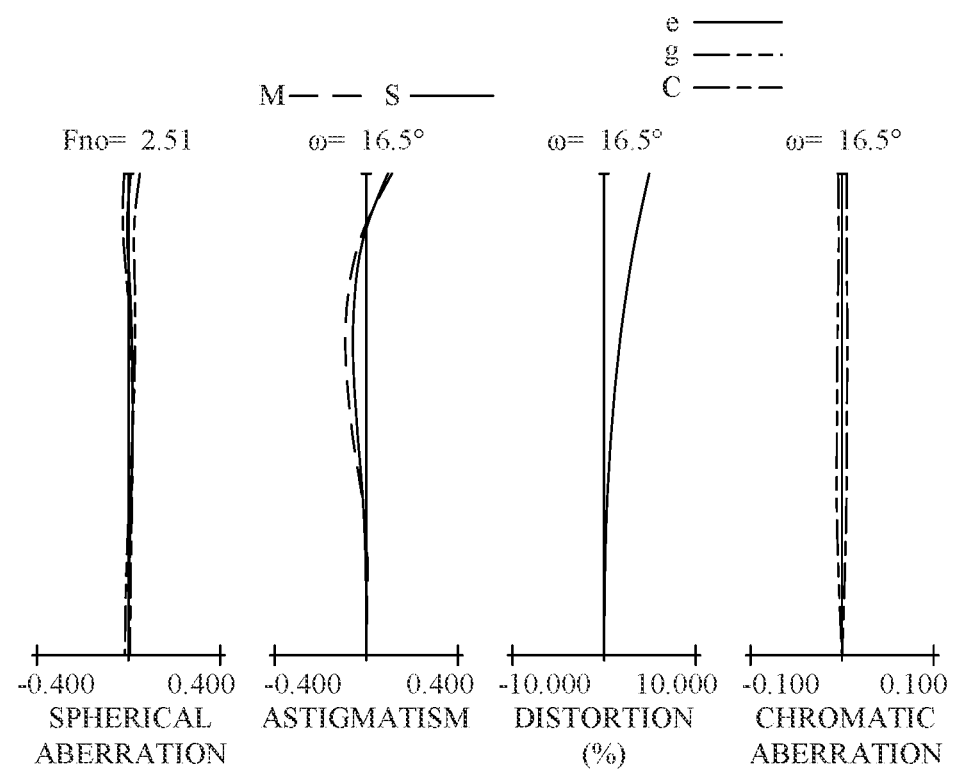
Figure 15:
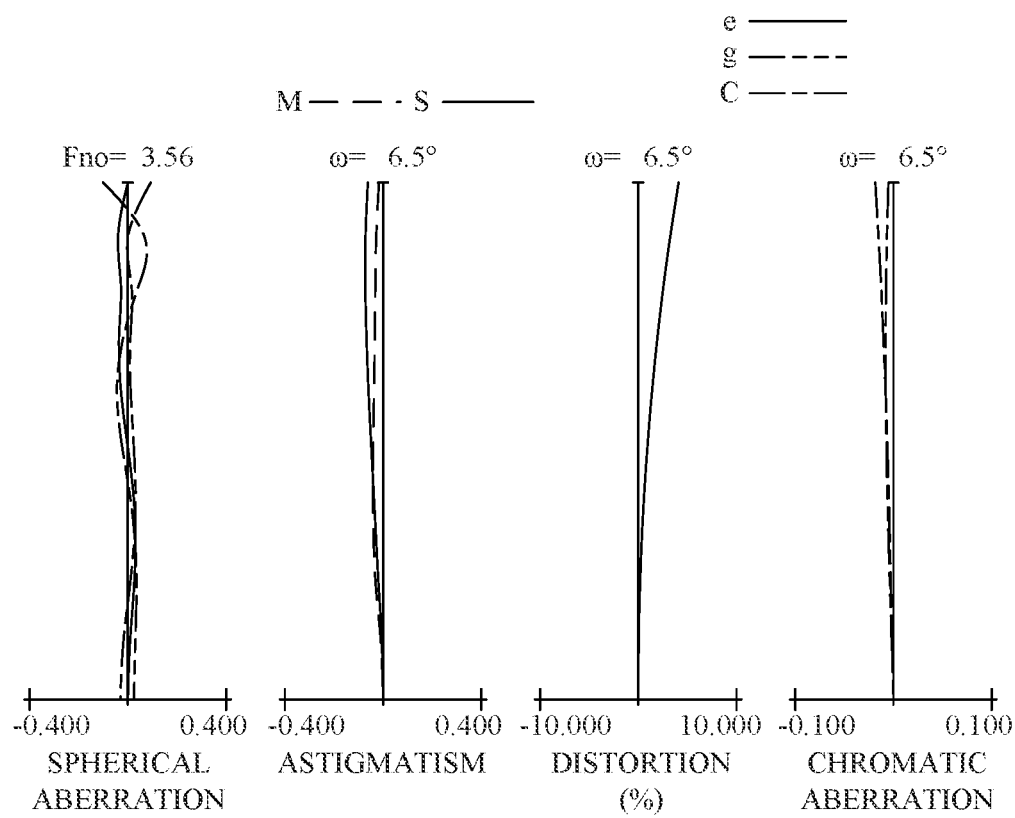
FIG. 15 is an aberration diagram of the zoom lens according to Example 5 at a telephoto end.

FIGS. 14A and 14B illustrate longitudinal aberrations of the zoom lens according to Example 5 (numerical example 5) at the wide-angle end and at the middle zoom position focal length 50 mm) in the infinity-focused state, respectively. FIG. 15 illustrates a longitudinal aberration of the zoom lens according to Example 5 at the telephoto end in the infinity in-focus state.

Table 1 summarizes the values of the conditions expressed in the expressions (1) to (13) in Example 5 (numerical example 5). The zoom lens according to Example 5 satisfies each condition, and has a small size, a light weight, a wide angle of view, and a high optical performance in the entire zoom range. In particular, in this example, the fourth lens unit U4 includes (consists of) two lenses or a single negative lens a single positive lens, and the fifth lens unit U5 includes (consists of) a single positive lens, so that the zoom lens has a wide angle of view, a small size, a light weight, a bright aperture diameter ratio, and a high optical performance. The diaphragm SP is moved independently of other lens units, and thus the zoom lens becomes smaller and lighter and the degree of freedom is improved in the aberration correction.

EXAMPLE 6

Figure 16:
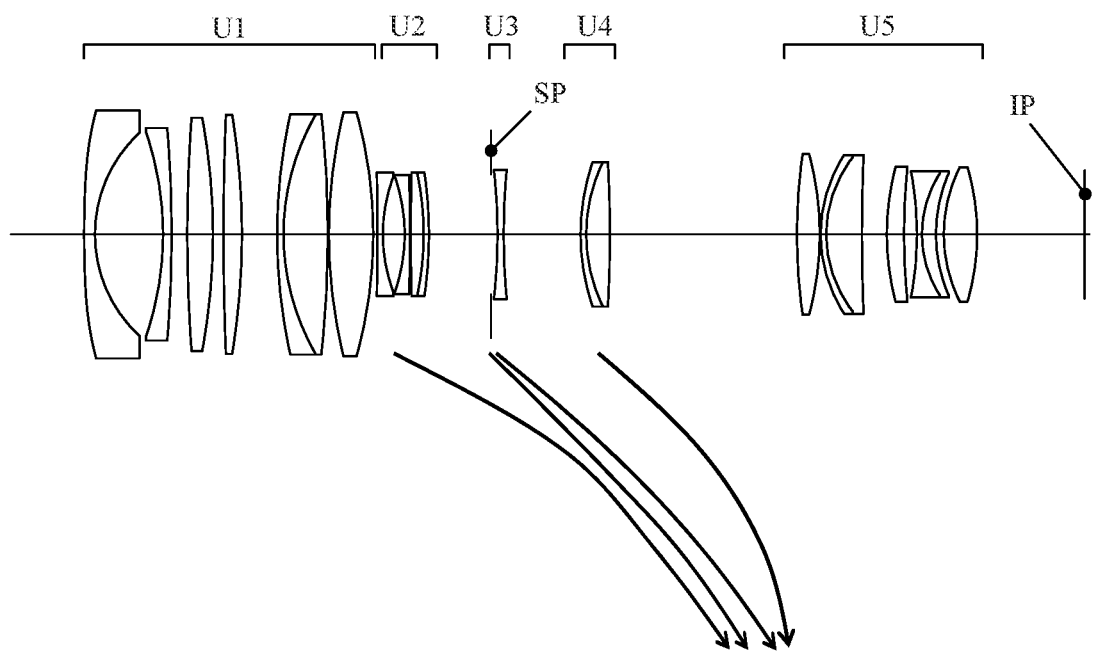
FIG. 16 is a sectional view of a zoom lens according to Example 6.

A zoom lens according to Example 6 (numerical example 6) illustrated in FIG. 16 includes, on a side closest to the object, a first lens unit U1 that has a positive refractive power, is not moved for zooming, and is moved for focusing. This zoom lens further includes the subsequent unit that includes, in order from the object side to the image side, a second lens unit U2 that has a negative refractive power and is moved toward the image side for zooming from the wide-angle end to the telephoto end, and a third lens unit U3 having a negative refractive power and a fourth lens unit U4 having a positive refractive power, which are moved during zooming, respectively. The fourth lens unit U4 is moved non-linearly on the optical axis in association with the movements of the second lens unit U2 and the third lens unit U3 in order to correct the image plane fluctuation during zooming. The subsequent unit further includes a fifth lens unit U5 that is disposed closest to the image plane, has a positive refractive power, and is not moved for zooming.

In this example, the second lens unit U2 corresponds to the n-th moving lens unit, the third lens unit U3 corresponds to the finally-moving negative lens unit m2, the fourth lens unit U4 corresponds to the finally-moving positive lens unit m1, and the fifth lens unit. US corresponds to the final lens unit r. The diaphragm SP is disposed between the second lens unit U2 and the third lens unit U3, and is moved independently of these lens units during zooming.

In numerical example 6, the first lens unit U1 corresponds to first to thirteenth surfaces. The second lens unit U2 corresponds to fourteenth to twentieth surfaces. The diaphragm SP corresponds to a twenty-first surface. The third lens unit U3 corresponds to twenty-second and twenty-third surfaces. The fourth lens unit U4 corresponds to twenty-fourth to twenty-sixth surfaces. The fifth lens unit US corresponds to twenty-seventh to thirty-eighth surfaces.

The first lens unit U1 includes a first lens subunit (first to sixth surfaces) that has a negative refractive power and is not moved for focusing, a second lens subunit (seventh and eighth surfaces) that has a negative refractive power and is moved to the image side during focusing from the infinity object to the short-distance object, and a third lens subunit (ninth to thirteenth surfaces) that has a positive refractive power and is not moved during focusing. In numerical example 6, the maxim wn air spacing mD12 between the third lens unit U3 and the fourth lens unit U4 is a distance obtained at a focal length of 27 mm.

Figure 17A:
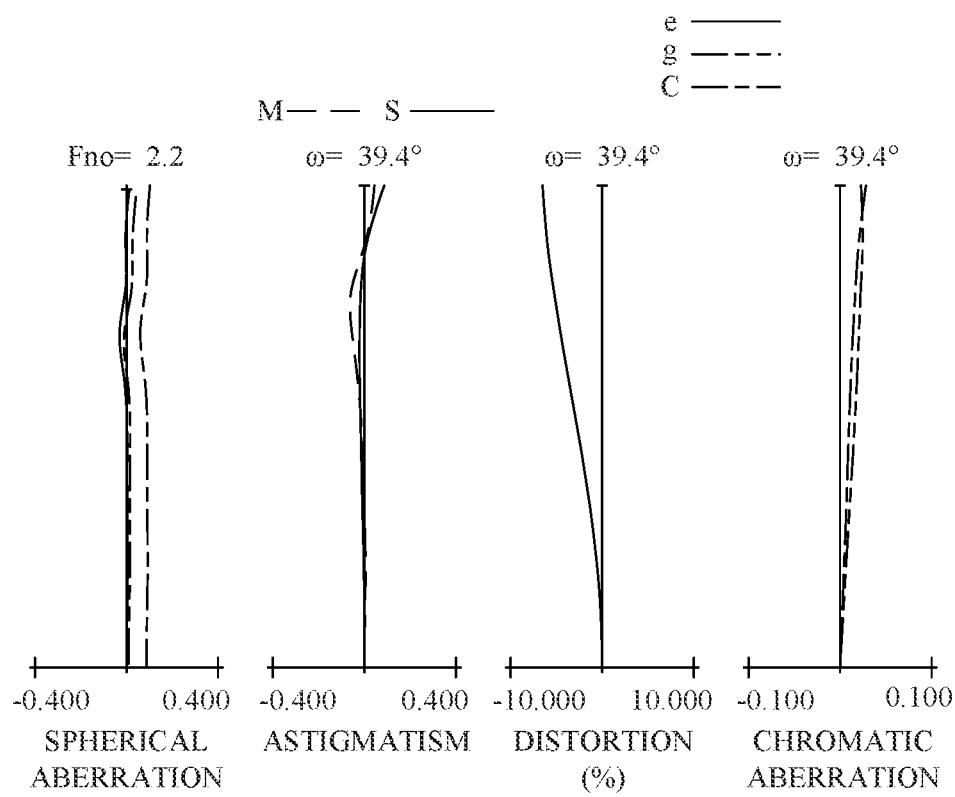
FIGS. 17A and 17B are aberration diagrams of the zoom lens according to Example 6 at a wide-angle end and at a middle zoom position, respectively.
Figure 17B:
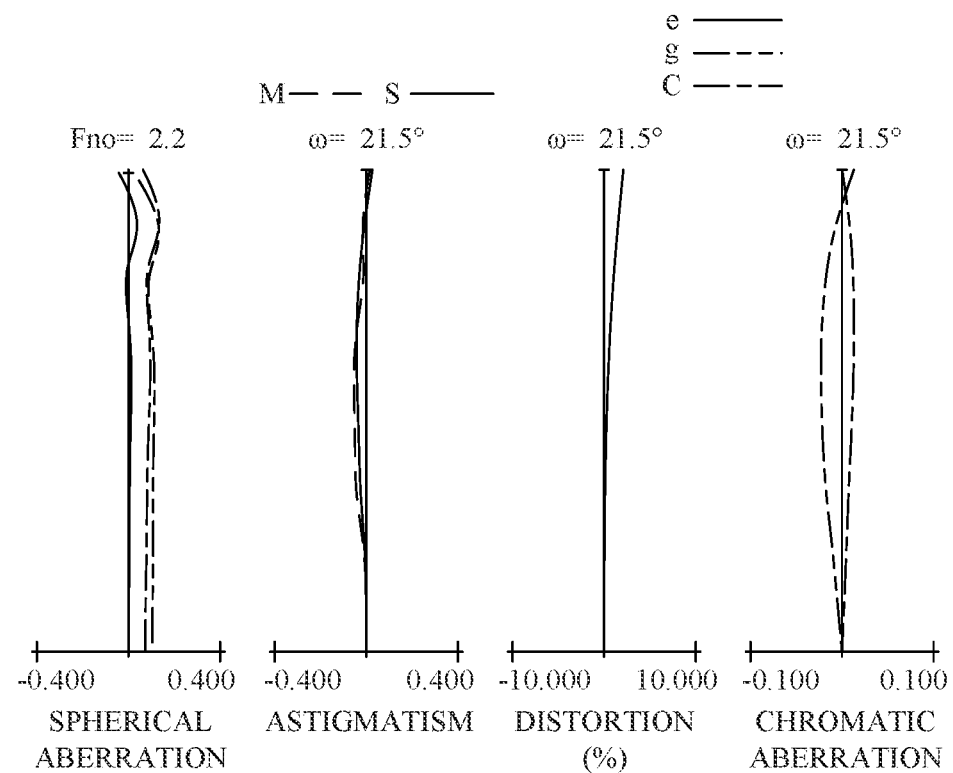
Figure 18:
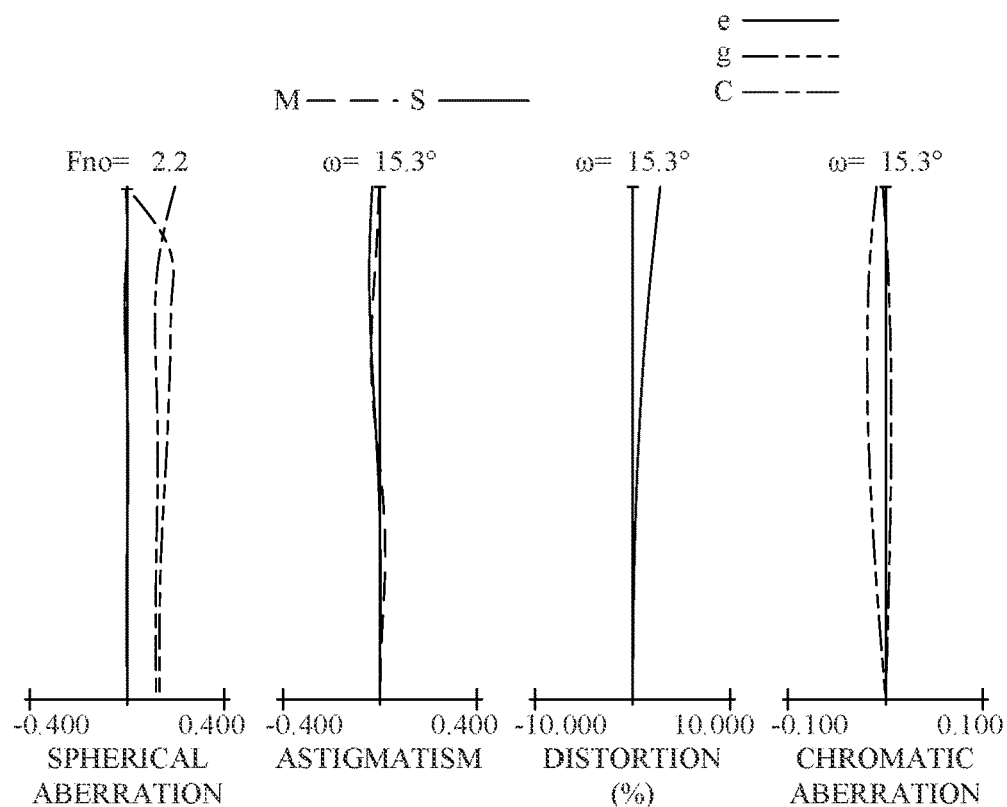
FIG. 18 is an aberration diagram of the zoom lens according to Example 6 at a telephoto end.

FIGS. 17A and 17B illustrate longitudinal aberrations of the, zoom lens according to Example 6 (numerical example 6) at the wide-angle end and at the middle zoom position (focal length 37.5 mm) in the infinity-focused state, respectively. FIG. 18 illustrates a longitudinal aberration of the zoom lens according to Example 6 at the telephoto end in the infinity in-focus state.

Table 1 summarizes the values of the conditions expressed in the expressions (1) to (13) in Example 6 (numerical example 6). The zoom lens according to Example 6 satisfies each condition, and has a small size, a light weight, a wide angle of view, and a high optical performance in the entire zoom range. In particular, in this example, the third lens unit U3 includes (consists of) a single negative lens and the fourth lens unit U4 includes (consists of) two lenses or a single negative lens and a single positive lens, so that the zoom lens has a wide angle of view; a small size, a light weight, a bright aperture diameter ratio, and a high optical performance. Moreover, the diaphragm SP is moved independently of other lens units, and thus the zoom lens becomes smaller and lighter and the degree of freedom is improved in the aberration correction.

(Numerical Example 1)

| | | | UNIT: mm | | | | |
|---|---|---|---|---|---|---|---|
| | | | Surface Data | | | | |
| Surface No. | r | d | nd | vd | θgF | Effective Diameter | Focal Length |
| 1* | 312.09871 | 2.50000 | 1.804000 | 46.53 | 0.5577 | 90.176 | −49.629 |
| 2 | 35.41165 | 27.44337 | 1.000000 | 0.00 | 0.0000 | 64.430 | 0.000 |
| 3 | −123.76796 | 1.50000 | 1.763850 | 48.49 | 0.5589 | 63.015 | −116.254 |
| 4 | 321.52157 | 6.91091 | 1.000000 | 0.00 | 0.0000 | 62.906 | 0.000 |
| 5 | 217.21964 | 1.50000 | 1.763850 | 48.49 | 0.5589 | 64.606 | −178.164 |
| 6 | 83.67057 | 9.23784 | 1.846660 | 23.78 | 0.6205 | 64.757 | 100.343 |
| 7 | 3203.73917 | 7.40933 | 1.000000 | 0.00 | 0.0000 | 64.754 | 0.000 |
| 8* | 83.80576 | 14.34011 | 1.603001 | 65.44 | 0.5401 | 65.507 | 80.546 |
| 9 | −109.00708 | 6.19099 | 1.000000 | 0.00 | 0.0000 | 64.910 | 0.000 |
| 10 | −1034.45742 | 1.50000 | 1.805181 | 25.42 | 0.6161 | 58.153 | −71.011 |
| 11 | 61.15588 | 8.17606 | 1.438750 | 94.66 | 0.5340 | 55.800 | 140.823 |
| 12 | 4621.73607 | 0.20000 | 1.000000 | 0.00 | 0.0000 | 55.752 | 0.000 |
| 13 | 122.00000 | 6.57256 | 1.755000 | 52.32 | 0.5474 | 55.738 | 102.307 |
| 14 | −208.22314 | 0.20000 | 1.000000 | 0.00 | 0.0000 | 55.765 | 0.000 |
| 15 | −497.04040 | 4.98914 | 1.712995 | 53.87 | 0.5459 | 55.542 | 182.160 |
| 16 | −103.76583 | (Variable) | 1.000000 | 0.00 | 0.0000 | 55.437 | 0.000 |
| 17 | −530.46608 | 1.25000 | 1.537750 | 74.70 | 0.5392 | 32.363 | −67.034 |
| 18 | 38.84025 | 5.22554 | 1.000000 | 0.00 | 0.0000 | 30.905 | 0.000 |
| 19 | −117.12242 | 1.25000 | 1.834810 | 42.74 | 0.5648 | 30.886 | −35.726 |
| 20 | 40.50865 | 5.25419 | 1.858956 | 22.73 | 0.6284 | 31.490 | 51.468 |
| 21 | 408.99391 | 3.47521 | 1.000000 | 0.00 | 0.0000 | 31.718 | 0.000 |
| 22 | −60.05260 | 1.25000 | 1.804000 | 46.53 | 0.5577 | 31.967 | −220.375 |
| 23 | −91.44834 | (Variable) | 1.000000 | 0.00 | 0.0000 | 32.710 | 0.000 |
| 24 | −96.04104 | 1.40000 | 1.496999 | 81.54 | 0.5375 | 33.650 | −159.776 |
| 25 | 468.65371 | (Variable) | 1.000000 | 0.00 | 0.0000 | 34.882 | 0.000 |
| 26 | (Diaphragm) | 6.64159 | 1.000000 | 0.00 | 0.0000 | 36.448 | 0.000 |
| 27 | 54.99081 | 6.45651 | 1.804000 | 46.58 | 0.5573 | 43.526 | 68.664 |
| 28* | 5820.92432 | (Variable) | 1.000000 | 0.00 | 0.0000 | 43.349 | 0.000 |
| 29 | 34.67248 | 8.39358 | 1.487490 | 70.23 | 0.5300 | 43.443 | 102.958 |
| 30 | 102.44709 | 5.19167 | 1.000000 | 0.00 | 0.0000 | 42.007 | 0.000 |
| 31 | 72.35771 | 1.30000 | 2.001000 | 29.14 | 0.5997 | 39.006 | −51.266 |
| 32 | 29.89349 | 11.31360 | 1.438750 | 94.66 | 0.5340 | 36.397 | 51.585 |
| 33 | −83.27147 | 0.49811 | 1.000000 | 0.00 | 0.0000 | 35.778 | 0.000 |
| 34 | 67.21711 | 11.67354 | 1.858956 | 22.73 | 0.6284 | 33.515 | 24.203 |
| 35 | −28.08537 | 1.20000 | 2.050900 | 26.94 | 0.6054 | 31.058 | −30.300 |
| 36 | −228.46114 | 0.43589 | 1.000000 | 0.00 | 0.0000 | 29.548 | 0.000 |
| 37 | 191.16657 | 1.10000 | 2.050900 | 26.94 | 0.6054 | 29.354 | −29.208 |

-continued

| | | | UNIT: mm | | | | |
|---|---|---|---|---|---|---|---|
| 38 | 26.56866 | 8.67028 | 1.589130 | 61.14 | 0.5407 | 28.676 | 49.991 |
| 39 | 230.28715 | 0.31516 | 1.000000 | 0.00 | 0.0000 | 29.644 | 0.000 |
| 40 | 48.39839 | 3.51047 | 1.487490 | 70.23 | 0.5300 | 30.558 | 266.078 |
| 41 | 75.21484 | 0.00000 | 1.000000 | 0.00 | 0.0000 | 30.645 | 0.000 |
| Image Plane | ∞ | | | | | | |

ASPHERIC DATA

1st Surface

K = 0.00000e+000 A 4 = 1.91539e−006 A 6 = −9.04805e−010 A 8 = 8.48122e−013
A10 = −7.22790e−016 A12 = 4.05143e−019 A14 = −1.23037e−022 A16 = 1.54023e−026
8th Surface K = 0.00000e+000 A 4 = −1.44627e−006 A 6 = 5.00529e−010 A 8 = −7.74823e−013
A10 = 1.05228e−015 A12 = −7.56855e−019 A14 = 2.69751e−022 A16 = −3.23896e−026
28th Surface K = 0.00000e+000 A 4 = 2.08152e−006 A 6 = 8.75490e−010 A 8 = −9.88539e−012
A10 = 5.49901e−014 A12 = −1.65657e−016 A14 = 2.49322e−019 A16 = −1.47945e−022

VARIOUS DATA
ZOOM RATIO 2.50

| | | | |
|---|---|---|---|
| Focal Length: | 20.00 | 35.00 | 50.00 |
| Fno: | 2.20 | 2.20 | 2.20 |
| Half Angle of View (°): | 47.25 | 31.72 | 23.40 |
| Overall Lens Length: | 284.12 | 284.12 | 284.12 |
| BF: | 50.30 | 50.30 | 50.30 |
| d16 | 1.19 | 27.56 | 40.67 |
| d23 | 26.78 | 4.68 | 2.37 |
| d25 | 3.17 | 7.88 | 2.70 |
| d28 | 18.19 | 9.22 | 3.60 |

Lens Unit Data

| Lens Unit | Starting Surface | Focal Length |
|---|---|---|
| 1 | 1 | 46.01 |
| 2 | 17 | −33.54 |
| 3 | 24 | −159.78 |
| 4 | 26 | 68.66 |
| 5 | 29 | 85.16 |

(Numerical Example 2)

| UNIT: mm | | | | | | | |
|---|---|---|---|---|---|---|---|
| Surface Data | | | | | | | |
| Surface No. | r | d | nd | vd | θgF | Effective Diameter | Focal Length |
| 1 | 565.31342 | 8.39049 | 1.517417 | 52.43 | 0.5564 | 96.986 | 328.873 |
| 2 | −243.78309 | 0.20000 | 1.000000 | 0.00 | 0.0000 | 95.873 | 0.000 |
| 3 | −496.37641 | 3.00000 | 1.639999 | 60.08 | 0.5370 | 90.984 | −154.244 |
| 4 | 124.12575 | 29.25722 | 1.000000 | 0.00 | 0.0000 | 81.947 | 0.000 |
| 5 | −333.77782 | 2.40000 | 1.639999 | 60.08 | 0.5370 | 72.355 | −154.035 |
| 6 | 141.08884 | 2.70809 | 1.846660 | 23.78 | 0.6205 | 69.103 | 678.773 |
| 7 | 184.75390 | 3.01070 | 1.000000 | 0.00 | 0.0000 | 68.544 | 0.000 |
| 8 | 209.32519 | 7.09849 | 1.595220 | 67.74 | 0.5442 | 69.149 | 194.445 |
| 9 | −257.60768 | 0.29722 | 1.000000 | 0.00 | 0.0000 | 69.567 | 0.000 |
| 10 | 140.25260 | 2.50000 | 1.846660 | 23.78 | 0.6205 | 70.979 | −265.373 |
| 11 | 85.96457 | 11.75989 | 1.438750 | 94.66 | 0.5340 | 70.236 | 146.472 |
| 12 | −246.40158 | 0.27182 | 1.000000 | 0.00 | 0.0000 | 70.376 | 0.000 |
| 13 | 73.94018 | 8.56360 | 1.712995 | 53.87 | 0.5459 | 70.251 | 131.702 |
| 14 | 325.68155 | (Variable) | 1.000000 | 0.00 | 0.0000 | 69.566 | 0.000 |
| 15 | 199.86035 | 1.50000 | 1.537750 | 74.70 | 0.5392 | 38.701 | −86.236 |
| 16 | 37.63806 | 5.72326 | 1.000000 | 0.00 | 0.0000 | 36.292 | 0.000 |
| 17 | −290.51681 | 1.50000 | 1.654115 | 39.68 | 0.5737 | 36.224 | −57.241 |
| 18 | 43.36578 | 4.14379 | 1.846660 | 23.78 | 0.6205 | 36.022 | 70.125 |
| 19 | 149.79522 | 4.74070 | 1.000000 | 0.00 | 0.0000 | 35.858 | 0.000 |
| 20 | −53.78699 | 1.50000 | 1.743997 | 44.78 | 0.5655 | 35.841 | −106.216 |
| 21 | −168.53308 | (Variable) | 1.000000 | 0.00 | 0.0000 | 36.848 | 0.000 |

-continued

| | | | UNIT: mm | | | | |
|---|---|---|---|---|---|---|---|
| 22 | −60.30318 | 1.50000 | 1.438750 | 94.66 | 0.5340 | 37.769 | −123.263 |
| 23 | 541.39520 | (Variable) | 1.000000 | 0.00 | 0.0000 | 39.869 | 0.000 |
| 24 | (Diaphragm) | 1.47190 | 1.000000 | 0.00 | 0.0000 | 41.604 | 0.000 |
| 25 | 76.20576 | 5.83517 | 2.001000 | 29.14 | 0.5997 | 44.862 | 64.166 |
| 26* | −414.18737 | (Variable) | 1.000000 | 0.00 | 0.0000 | 44.843 | 0.000 |
| 27 | 112.60564 | 7.25699 | 1.487490 | 70.23 | 0.5300 | 44.815 | 108.716 |
| 28 | −98.63129 | 4.21449 | 1.000000 | 0.00 | 0.0000 | 44.477 | 0.000 |
| 29 | 254.35708 | 1.50000 | 1.854780 | 24.80 | 0.6122 | 41.062 | −38.968 |
| 30 | 29.61810 | 11.48226 | 1.618000 | 63.33 | 0.5441 | 38.600 | 41.362 |
| 31 | −163.41664 | 5.01834 | 1.000000 | 0.00 | 0.0000 | 38.210 | 0.000 |
| 32 | 116.26650 | 7.59835 | 1.806100 | 40.93 | 0.5713 | 35.578 | 37.990 |
| 33 | −40.67631 | 1.10000 | 1.854780 | 24.80 | 0.6122 | 34.822 | −37.737 |
| 34 | 165.31961 | 6.80980 | 1.000000 | 0.00 | 0.0000 | 34.968 | 0.000 |
| 35 | 154.24702 | 12.35412 | 1.892860 | 20.36 | 0.6393 | 36.588 | 30.030 |
| 36 | −31.65728 | 1.10000 | 1.800999 | 34.97 | 0.5864 | 36.627 | −23.247 |
| 37 | 46.68041 | 0.59421 | 1.000000 | 0.00 | 0.0000 | 35.897 | 0.000 |
| 38 | 64.70769 | 6.80513 | 1.539956 | 59.46 | 0.5441 | 35.593 | 101.725 |
| 39 | −359.44654 | 0.00000 | 1.000000 | 0.00 | 0.0000 | 36.219 | 0.000 |
| Image Plane | ∞ | | | | | | |

ASPHERIC DATA
26th Surface

K = 0.00000e+000 A 4 = 1.36315e−006 A 6 = −3.51991e−011 A 8 = −4.35765e−014
A10 = 1.49816e−017

VARIOUS DATA
ZOOM RATIO 3.00

| Focal Length: | 45.00 | 67.00 | 90.00 | 135.00 |
|---|---|---|---|---|
| Fno: | 2.20 | 2.20 | 2.20 | 2.20 |
| Half Angle of View (°): | 27.27 | 19.10 | 14.44 | 9.75 |
| Overall Lens Length: | 285.78 | 285.78 | 285.78 | 285.78 |
| BF: | 52.00 | 52.00 | 52.00 | 52.00 |
| d14 | 1.13 | 21.68 | 36.34 | 51.33 |
| d21 | 29.42 | 7.94 | 4.52 | 4.51 |
| d23 | 9.25 | 13.87 | 11.12 | 2.92 |
| d26 | 20.94 | 17.25 | 8.76 | 1.99 |

Lens Unit Data

| Lens Unit | Starting Surface | Focal Length |
|---|---|---|
| 1 | 1 | 106.54 |
| 2 | 15 | −37.98 |
| 3 | 22 | −123.26 |
| 4 | 24 | 64.17 |
| 5 | 27 | 95.60 |

(Numerical Example 3)

| | | | UNIT: mm | | | | |
|---|---|---|---|---|---|---|---|
| | | | Surface Data | | | | |
| Surface No. | r | d | nd | vd | θgF | Effective Diameter | Focal Length |
| 1* | 963.48779 | 2.50000 | 1.834810 | 42.74 | 0.5648 | 79.927 | −39.756 |
| 2 | 32.21778 | 16.56896 | 1.000000 | 0.00 | 0.0000 | 56.513 | 0.000 |
| 3* | 176.21722 | 2.00000 | 1.816000 | 46.62 | 0.5568 | 55.665 | −216.003 |
| 4 | 87.89143 | 9.46327 | 1.000000 | 0.00 | 0.0000 | 53.246 | 0.000 |
| 5 | −92.63298 | 1.80000 | 1.882997 | 40.76 | 0.5667 | 52.755 | −111.739 |
| 6 | −1404.04903 | 0.15000 | 1.000000 | 0.00 | 0.0000 | 53.355 | 0.000 |
| 7 | 101.56945 | 4.35199 | 1.922860 | 18.90 | 0.6495 | 54.075 | 139.918 |
| 8 | 445.99650 | 3.28870 | 1.000000 | 0.00 | 0.0000 | 53.812 | 0.000 |
| 9 | 211.03669 | 7.04881 | 1.595220 | 67.74 | 0.5442 | 52.875 | 118.909 |
| 10* | −105.72030 | 4.45598 | 1.000000 | 0.00 | 0.0000 | 52.419 | 0.000 |
| 11 | −1118.38500 | 8.36306 | 1.433870 | 95.10 | 0.5373 | 51.267 | 133.670 |
| 12 | −55.39308 | 0.29743 | 1.000000 | 0.00 | 0.0000 | 51.911 | 0.000 |
| 13 | −55.40012 | 1.70000 | 1.800000 | 29.84 | 0.6017 | 51.902 | −146.757 |
| 14 | −105.59441 | 0.18000 | 1.000000 | 0.00 | 0.0000 | 53.959 | 0.000 |
| 15 | 154.10268 | 1.70000 | 1.916500 | 31.60 | 0.5911 | 56.307 | −103.302 |
| 16 | 58.60506 | 13.06047 | 1.438750 | 94.66 | 0.5340 | 56.367 | 94.291 |

-continued

| | | | UNIT: mm | | | | |
|---|---|---|---|---|---|---|---|
| 17 | −132.22982 | 0.40000 | 1.000000 | 0.00 | 0.0000 | 57.470 | 0.000 |
| 18 | 1432.31631 | 8.96363 | 1.433870 | 95.10 | 0.5373 | 59.006 | 151.279 |
| 19 | −68.83776 | 0.40000 | 1.000000 | 0.00 | 0.0000 | 59.501 | 0.000 |
| 20 | 116.03285 | 7.88147 | 1.763850 | 48.49 | 0.5589 | 59.128 | 95.318 |
| 21 | −192.20285 | (Variable) | 1.000000 | 0.00 | 0.0000 | 58.686 | 0.000 |
| 22 | 182.45216 | 0.70000 | 2.001000 | 29.14 | 0.5997 | 22.265 | −23.163 |
| 23 | 20.67952 | 3.78836 | 1.000000 | 0.00 | 0.0000 | 20.084 | 0.000 |
| 24 | −67.41255 | 0.70000 | 1.438750 | 94.66 | 0.5340 | 19.908 | −67.266 |
| 25 | 52.89819 | 2.45901 | 1.000000 | 0.00 | 0.0000 | 19.501 | 0.000 |
| 26 | −184.88863 | 5.09230 | 1.854780 | 24.80 | 0.6122 | 19.390 | 19.629 |
| 27 | −15.71421 | 0.70000 | 1.882997 | 40.76 | 0.5667 | 19.395 | −15.994 |
| 28 | 151.05341 | 0.24382 | 1.000000 | 0.00 | 0.0000 | 19.498 | 0.000 |
| 29 | 41.93140 | 2.78127 | 1.647689 | 33.79 | 0.5938 | 19.674 | 54.414 |
| 30 | −224.97708 | (Variable) | 1.000000 | 0.00 | 0.0000 | 19.542 | 0.000 |
| 31 | −34.77729 | 0.80000 | 1.729157 | 54.68 | 0.5444 | 18.699 | −26.093 |
| 32 | 42.82558 | 2.38385 | 1.846660 | 23.78 | 0.6205 | 19.783 | 58.388 |
| 33 | 293.47891 | (Variable) | 1.000000 | 0.00 | 0.0000 | 20.172 | 0.000 |
| 34 | (Diaphragm) | 1.00000 | 1.000000 | 0.00 | 0.0000 | 26.100 | 0.000 |
| 35* | 69.10287 | 5.05113 | 1.589130 | 61.14 | 0.5407 | 27.442 | 71.819 |
| 36 | −107.23910 | 0.50000 | 1.000000 | 0.00 | 0.0000 | 28.140 | 0.000 |
| 37 | 66.08017 | 4.22964 | 1.487490 | 70.23 | 0.5300 | 28.822 | 120.623 |
| 38 | −539.28698 | (Variable) | 1.000000 | 0.00 | 0.0000 | 28.827 | 0.000 |
| 39 | 74.09824 | 5.00000 | 1.639799 | 34.46 | 0.5922 | 27.876 | 55.182 |
| 40 | −66.52059 | 5.47385 | 1.000000 | 0.00 | 0.0000 | 27.511 | 0.000 |
| 41 | −112.12205 | 0.90000 | 1.882997 | 40.76 | 0.5667 | 23.895 | −19.734 |
| 42 | 20.85216 | 6.79806 | 1.487490 | 70.23 | 0.5300 | 22.949 | 38.664 |
| 43 | −181.51707 | 0.50000 | 1.000000 | 0.00 | 0.0000 | 23.271 | 0.000 |
| 44 | 45.98850 | 8.01769 | 1.438750 | 94.66 | 0.5340 | 23.507 | 35.367 |
| 45 | −22.25685 | 0.90000 | 2.001000 | 29.14 | 0.5997 | 23.517 | −42.451 |
| 46 | −47.26612 | 0.50000 | 1.000000 | 0.00 | 0.0000 | 24.566 | 0.000 |
| 47 | 99.45872 | 5.89156 | 1.487490 | 70.23 | 0.5300 | 25.327 | 48.495 |
| 48 | −30.54482 | 4.00000 | 1.000000 | 0.00 | 0.0000 | 25.527 | 0.000 |
| 49 | ∞ | 33.00000 | 1.608590 | 46.44 | 0.5664 | 40.000 | 0.000 |
| 50 | ∞ | 13.20000 | 1.516800 | 64.17 | 0.5347 | 40.000 | 0.000 |
| 51 | ∞ | 0.00000 | 1.000000 | 0.00 | 0.0000 | 40.000 | 0.000 |
| Image Plane | ∞ | | | | | | |

ASPHERIC DATA

1st Surface

K = 0.00000e+000 A 4 = 3.44812e−006 A 6 = 1.07704e−008 A 8 = 7.67357e−012
A10 = 9.50640e−014 A12 = 1.11173e−016 A14 = 1.84902e−020 A16 = −4.54134e−026
A 3 = 1.18753e−005 A 5 = −1.35919e−007 A 7 = −3.25626e−010 A 9 = −1.17107e−012
A11 = −4.11261e−015 A13 = −1.90081e−018 A15 = −7.34375e−023

3rd Surface

K = 0.00000e+000 A 4 = −2.23245e−006 A 6 = −7.25846e−008 A 8 = −7.12638e−010
A10 = −3.22136e−013 A12 = 1.59835e−015 A14 = −6.53534e−019 A16 = −2.01913e−022
A 3 = −8.59491e−006 A 5 = 3.82988e−007 A 7 = 9.13105e−009 A 9 = 3.03033e−011
A11 = −3.27032e−014 A13 = −1.78607e−017 A15 = 2.22630e−020

10th Surface

K = 0.00000e+000 A 4 = 9.40059e−007 A 6 = 1.41016e−008 A 8 = 2.70921e−010
A10 = 2.08488e−013 A12 = −7.69021e−016 A14 = 1.05318e−018 A16 = 2.20512e−022
A 3 = −1.65554e−006 A 5 = −2.41420e−008 A 7 = −2.66426e−009 A 9 = −1.44061e−011
A11 = 1682720−014 A13 = −4.84134e−018 A15 = −2.64586e−020

35th Surface

K = −9.88912e+000 A 4 = −7.04883e−007 A 6 = −1.40259e−009 A 8 = −1.03348e−012

VARIOUS DATA
ZOOM RATIO 13.64

| Focal Length: | 4.40 | 16.00 | 60.00 |
|---|---|---|---|
| Fno: | 1.85 | 1.85 | 2.74 |
| Half Angle of View (°): | 51.34 | 18.97 | 5.24 |
| Overall Lens Length: | 307.65 | 307.65 | 307.65 |
| BF: | 7.45 | 7.45 | 7.45 |
| d21 | 0.65 | 39.52 | 57.72 |
| d30 | 38.78 | 1.50 | 6.83 |
| d33 | 12.81 | 16.79 | 1.20 |
| d38 | 38.77 | 33.20 | 25.27 |

-continued

| UNIT: mm | | |
|---|---|---|
| Lens Unit Data | | |
| Lens Unit | Starting Surface | Focal Length |
| 1 | 1 | 31.68 |
| 2 | 22 | −20.30 |
| 3 | 31 | −47.23 |
| 4 | 34 | 45.67 |
| 5 | 39 | 50.32 |

(Numerical Example 4)

| UNIT: mm | | | | | | |
|---|---|---|---|---|---|---|
| Surface Data | | | | | | |
| Surface No. | r | d | nd | vd | θgF | Effective Diameter | Focal Length |
|---|---|---|---|---|---|---|---|
| 1* | 107.58786 | 2.40000 | 1.763850 | 48.49 | 0.5589 | 73.044 | −46.128 |
| 2 | 26.38228 | 25.82333 | 1.000000 | 0.00 | 0.0000 | 50.774 | 0.000 |
| 3 | −80.19301 | 1.64503 | 1.763850 | 48.49 | 0.5589 | 48.067 | −44.969 |
| 4 | 61.14574 | 3.11155 | 1.000000 | 0.00 | 0.0000 | 46.370 | 0.000 |
| 5 | 65.03455 | 6.75280 | 1.854780 | 24.80 | 0.6122 | 47.389 | 70.937 |
| 6 | −991.28086 | 2.10705 | 1.000000 | 0.00 | 0.0000 | 47.014 | 0.000 |
| 7 | 2435.96345 | 5.33796 | 1.537750 | 74.70 | 0.5392 | 46.071 | 192.449 |
| 8* | −108.35892 | 5.86909 | 1.000000 | 0.00 | 0.0000 | 46.283 | 0.000 |
| 9 | −77.53096 | 1.50000 | 1.800000 | 29.84 | 0.6017 | 45.577 | −53.979 |
| 10 | 100.09169 | 10.19852 | 1.496999 | 81.54 | 0.5375 | 47.085 | 74.030 |
| 11 | −56.46737 | 0.26908 | 1.000000 | 0.00 | 0.0000 | 47.798 | 0.000 |
| 12 | 59.42574 | 1.50000 | 1.834000 | 37.16 | 0.5776 | 48.441 | −91.650 |
| 13 | 33.13983 | 12.18992 | 1.589130 | 61.14 | 0.5407 | 46.324 | 51.800 |
| 14 | −350.03933 | 0.20000 | 1.000000 | 0.00 | 0.0000 | 46.036 | 0.000 |
| 15 | 65.72328 | 6.50682 | 1.763850 | 48.49 | 0.5589 | 44.526 | 73.309 |
| 16 | −374.47003 | (Variable) | 1.000000 | 0.00 | 0.0000 | 43.561 | 0.000 |
| 17 | 456.78250 | 1.10000 | 1.834810 | 42.74 | 0.5648 | 26.293 | −33.078 |
| 18 | 26.14735 | 5.69692 | 1.000000 | 0.00 | 0.0000 | 25.108 | 0.000 |
| 19 | −60.59851 | 1.00000 | 1.496999 | 81.54 | 0.5375 | 25.562 | −56.691 |
| 20 | 53.23977 | 0.19937 | 1.000000 | 0.00 | 0.0000 | 27.273 | 0.000 |
| 21 | 43.65730 | 4.86019 | 2.001000 | 29.14 | 0.5997 | 28.026 | 35.526 |
| 22 | −189.27119 | (Variable) | 1.000000 | 0.00 | 0.0000 | 28.182 | 0.000 |
| 23 | −47.87285 | 1.20000 | 1.763850 | 48.49 | 0.5589 | 28.190 | −69.454 |
| 24 | −474.24532 | 2.30134 | 1.000000 | 0.00 | 0.0000 | 29.018 | 0.000 |
| 25 | (Diaphragm) | (Variable) | 1.000000 | 0.00 | 0.0000 | 30.104 | 0.000 |
| 26 | 504.53903 | 1.20000 | 1.891900 | 37.13 | 0.5780 | 30.748 | −144.140 |
| 27 | 102.85825 | 1.61908 | 1.717362 | 29.52 | 0.6047 | 31.164 | 275.425 |
| 28 | 211.31465 | (Variable) | 1.000000 | 0.00 | 0.0000 | 31.414 | 0.000 |
| 29* | 45.86226 | 5.55563 | 1.696797 | 55.53 | 0.5434 | 34.434 | 57.172 |
| 30 | −297.80366 | (Variable) | 1.000000 | 0.00 | 0.0000 | 34.491 | 0.000 |
| 31 | −1075.02325 | 3.84064 | 1.763850 | 48.49 | 0.5589 | 34.000 | 103.125 |
| 32 | −73.84411 | 8.02428 | 1.000000 | 0.00 | 0.0000 | 33.991 | 0.000 |
| 33 | 37.26529 | 5.92550 | 1.517417 | 52.43 | 0.5564 | 28.983 | 53.571 |
| 34 | −104.15074 | 1.20000 | 2.000690 | 25.46 | 0.6136 | 28.655 | −26.075 |
| 35 | 35.45085 | 0.19760 | 1.000000 | 0.00 | 0.0000 | 28.372 | 0.000 |
| 36 | 24.91782 | 8.74590 | 1.595220 | 67.74 | 0.5442 | 30.792 | 32.989 |
| 37 | −81.82293 | 0.53816 | 1.000000 | 0.00 | 0.0000 | 30.508 | 0.000 |
| 38 | −2269.28963 | 1.20000 | 2.000690 | 25.46 | 0.6136 | 29.590 | −18.188 |
| 39 | 18.52406 | 8.67501 | 1.922860 | 18.90 | 0.6495 | 27.881 | 18.803 |
| 40 | −263.21728 | 1.99878 | 1.000000 | 0.00 | 0.0000 | 27.578 | 0.000 |
| 41 | 285.65324 | 8.95213 | 1.496999 | 81.54 | 0.5375 | 26.508 | 31.640 |
| 42 | −16.51890 | 1.10000 | 2.003300 | 28.27 | 0.5980 | 25.779 | −20.674 |
| 43 | −81.21906 | 0.00000 | 1.000000 | 0.00 | 0.0000 | 28.187 | 0.000 |
| Image Plane | ∞ | | | | | | |

| ASPHERIC DATA |
|---|
| 1st Surface |

K = 0.00000e+000 A 4 = 3.70534e−006 A 6 = −1.65787e−009 A 8 = 1.42981e−012
A10 = −7.28306e−016 A12 = 3.41473e−019 A14 = −9.69561e−023 A16 = 1.48551e−026

| UNIT: mm |
|---|
| 8th Surface |

K = 0.00000e+000 A 4 = 7.06974e−007 A 6 = −1.72.530e−009 A 8 = 7.19872e−013
A10 = −6.21181e−016 A12 = 7.56517e−020

29th Surface

K = 0.00000e+000 A 4 = −3.37197e−006 A 6 = −2.04690e−010 A 8 = −7.48146e−013

| VARIOUS DATA ZOOM RATIO 2.00 | | | |
|---|---|---|---|
| Focal Length: | 18.00 | 22.60 | 36.00 |
| Fno: | 2.40 | 2.40 | 2.40 |
| Half Angle of View (°): | 50.24 | 43.80 | 31.00 |
| Overall Lens Length: | 230.26 | 230.26 | 230.26 |
| BF: | 32.80 | 32.80 | 32.80 |
| d16 | 0.99 | 12.00 | 28.52 |
| d22 | 3.27 | 3.10 | 3.33 |
| d25 | 11.70 | 6.62 | 1.26 |
| d28 | 5.90 | 6.72 | 2.31 |
| d30 | 15.06 | 8.48 | 1.50 |

| Lens Unit Data | | |
|---|---|---|
| Lens Unit | Starting Surface | Focal Length |
| 1 | 1 | 33.50 |
| 2 | 17 | −60.90 |
| 3 | 23 | −69.45 |
| 4 | 26 | −300.00 |
| 5 | 29 | 57.17 |
| 6 | 31 | 87.59 |

(Numerical Example 5)

| UNIT: mm |
|---|
| Surface Data |

| Surface No. | r | d | nd | vd | θgF | Effective Diameter | Focal Length |
|---|---|---|---|---|---|---|---|
| 1* | 179.28818 | 2.58020 | 1.800999 | 34.97 | 0.5864 | 88.384 | −65.453 |
| 2 | 40.51580 | 28.15343 | 1.000000 | 0.00 | 0.0000 | 68.427 | 0.000 |
| 3 | −84.81243 | 1.64503 | 1.639999 | 60.08 | 0.5370 | 67.003 | −105.635 |
| 4 | 342.44067 | 0.17808 | 1.000000 | 0.00 | 0.0000 | 67.172 | 0.000 |
| 5 | 142.27010 | 6.36004 | 1.959060 | 17.47 | 0.6598 | 67.574 | 136.595 |
| 6 | −1941.09474 | 1.48371 | 1.000000 | 0.00 | 0.0000 | 67.250 | 0.000 |
| 7 | 215.87053 | 9.55363 | 1.537750 | 74.70 | 0.5392 | 65.711 | 140.386 |
| 8* | −114.85361 | 6.55908 | 1.000000 | 0.00 | 0.0000 | 65.655 | 0.000 |
| 9 | −614.33686 | 8.00749 | 1.487490 | 70.23 | 0.5300 | 67.083 | 190.144 |
| 10 | −81.12458 | 2.00000 | 1.850250 | 30.05 | 0.5979 | 67.301 | −253.819 |
| 11 | −130.85190 | 0.17660 | 1.000000 | 0.00 | 0.0000 | 68.643 | 0.000 |
| 12 | 166.94003 | 1.84300 | 1.846660 | 23.78 | 0.6205 | 69.198 | −120.436 |
| 13 | 63.36609 | 13.93587 | 1.438750 | 94.66 | 0.5340 | 68.495 | 118.498 |
| 14 | −274.01084 | 0.18430 | 1.000000 | 0.00 | 0.0000 | 68.962 | 0.000 |
| 15 | 235.61253 | 5.36965 | 1.537750 | 74.70 | 0.5392 | 70.377 | 309.585 |
| 16 | −569.02578 | 0.18430 | 1.000000 | 0.00 | 0.0000 | 70.499 | 0.000 |
| 17 | 1629.47679 | 8.33649 | 1.763850 | 48.49 | 0.5589 | 70.577 | 124.954 |
| 18 | −101.68731 | (Variable) | 1.000000 | 0.00 | 0.0000 | 70.591 | 0.000 |
| 19* | −115.10910 | 1.19795 | 1.595220 | 67.74 | 0.5442 | 30.642 | −48.039 |
| 20 | 38.37112 | 4.14288 | 1.000000 | 0.00 | 0.0000 | 27.108 | 0.000 |
| 21 | −92.99580 | 0.82935 | 1.537750 | 74.70 | 0.5392 | 26.542 | −89.867 |
| 22 | 101.59645 | 1.76664 | 1.000000 | 0.00 | 0.0000 | 25.573 | 0.000 |
| 23 | −105.92074 | 2.39760 | 1.800000 | 29.84 | 0.6017 | 25.489 | 103.425 |
| 24 | −47.13037 | 0.82935 | 1.595220 | 67.74 | 0.5442 | 25.306 | −123.677 |
| 25 | −131.04411 | (Variable) | 1.000000 | 0.00 | 0.0000 | 24.872 | 0.000 |
| 26 | −48.70990 | 0.82935 | 1.804000 | 46.53 | 0.5577 | 24.475 | −32.026 |
| 27 | 55.64235 | 2.17206 | 1.892860 | 20.36 | 0.6393 | 25.718 | 79.883 |
| 28 | 238.73317 | (Variable) | 1.000000 | 0.00 | 0.0000 | 26.001 | 0.000 |
| 29 | (Diaphragm) | (Variable) | 1.000000 | 0.00 | 0.0000 | 26.750 | 0.000 |
| 30* | 58.64939 | 5.22236 | 1.651597 | 58.55 | 0.5425 | 34.735 | 59.634 |
| 31 | −112.43994 | (Variable) | 1.000000 | 0.00 | 0.0000 | 34.993 | 0.000 |
| 32 | 97.47026 | 6.17264 | 1.589130 | 61.14 | 0.5407 | 40.750 | 76.715 |

-continued

UNIT: mm

| | | | | | | | |
|---|---|---|---|---|---|---|---|
| 33 | −82.88656 | 0.18430 | 1.000000 | 0.00 | 0.0000 | 40.841 | 0.000 |
| 34 | 98.28048 | 9.16148 | 1.487490 | 70.23 | 0.5300 | 39.862 | 61.841 |
| 35 | −42.36176 | 1.10580 | 2.000690 | 25.46 | 0.6136 | 39.233 | −66.298 |
| 36 | −116.83120 | 0.18430 | 1.000000 | 0.00 | 0.0000 | 39.558 | 0.000 |
| 37 | 71.96735 | 9.16590 | 1.518229 | 58.90 | 0.5457 | 38.677 | 66.389 |
| 38 | −63.53394 | 1.01365 | 1.799516 | 42.22 | 0.5672 | 37.507 | −32.539 |
| 39 | 44.79204 | 11.24992 | 1.000000 | 0.00 | 0.0000 | 36.255 | 0.000 |
| 40 | 123.08263 | 10.52827 | 1.487490 | 70.23 | 0.5300 | 40.293 | 58.517 |
| 41 | −36.24874 | 0.36860 | 1.000000 | 0.00 | 0.0000 | 40.758 | 0.000 |
| 42 | 1390.32998 | 7.58399 | 1.922860 | 18.90 | 0.6495 | 37.839 | 34.512 |
| 43 | −32.92256 | 0.82935 | 1.882997 | 40.76 | 0.5667 | 37.466 | −35.829 |
| 44 | 962.30499 | 1.99586 | 1.000000 | 0.00 | 0.0000 | 35.571 | 0.000 |
| 45 | 60.62112 | 8.40348 | 1.438750 | 94.66 | 0.5340 | 33.479 | 49.322 |
| 46 | −32.35520 | 0.92150 | 2.000690 | 25.46 | 0.6136 | 32.626 | −21.660 |
| 47 | 68.50387 | 0.64505 | 1.000000 | 0.00 | 0.0000 | 32.599 | 0.000 |
| 48 | 61.62245 | 5.48371 | 1.589130 | 61.14 | 0.5407 | 33.088 | 60.474 |
| 49 | −82.42064 | 0.00000 | 1.000000 | 0.00 | 0.0000 | 33.239 | 0.000 |
| Image Plane | ∞ | | | | | | |

ASPHERIC DATA

1st Surface

K = 0.00000e+000 A 4 = 3.26965e−007 A 6 = 3.49556e−010 A 8 = −2.18678e−013
A10 = 7.29562e−017 A12 = −9.64672e−021

8th Surface

K = 0.00000e+000 A 4 = 6.44973e−007 A 6 = −1.23889e−012 A 8 = 8.79826e−014
A10 = −1.25104e−016 A12 = 4.19714e−020

19th Surface

K = 0.00000e+000 A 4 = 3.54713e−006 A 6 = −4.63834e−009 A 8 = 7.10201e−012
A10 = −2.64552e−014 A12 = 5.17715e−017

30th Surface

K = 0.00000e+000 A 4 = −3.30420e−006 A 6 = 1.56947e−009 A 8 = −1.01392e−012

VARIOUS DATA
ZOOM RATIO 8.40

| | | | | |
|---|---|---|---|---|
| Focal Length: | 15.50 | 28.50 | 50.00 | 130.20 |
| Fno: | 2.40 | 2.44 | 2.51 | 3.56 |
| Half Angle of View (°): | 43.68 | 2.7.43 | 16.49 | 6.50 |
| Image Height: | 14.80 | 14.80 | 14.80 | 14.80 |
| Overall Lens Length: | 315.01 | 315.01 | 315.01 | 315.01 |
| BF: | 39.85 | 39.85 | 39.85 | 39.85 |
| d18 | 0.69 | 29.65 | 51.38 | 73.10 |
| d25 | 32.71 | 9.77 | 2.50 | 6.65 |
| d28 | 3.00 | 3.46 | 2.13 | 1.50 |
| d29 | 13.45 | 15.41 | 14.88 | 1.48 |
| d31 | 34.38 | 25.93 | 13.33 | 1.49 |

Lens Unit Data

| Lens Unit | Starting Surface | Focal Length |
|---|---|---|
| 1 | 1 | 61.70 |
| 2 | 19 | −32.45 |
| 3 | 26 | −53.35 |
| 4 | 29 | (Diaphragm) |
| 5 | 30 | 59.63 |
| 6 | 32 | 73.74 |

(Numerical Example 6)

UNIT: mm

Surface Data

| Surface No. | r | d | nd | vd | θgF | Effective Diameter | Focal Length |
|---|---|---|---|---|---|---|---|
| 1* | 331.42801 | 2.50000 | 1.905250 | 35.04 | 0.5848 | 55.948 | −38.742 |
| 2 | 31.79439 | 15.85559 | 1.000000 | 0.00 | 0.0000 | 45.633 | 0.000 |

-continued

| UNIT: mm | | | | | | | |
|---|---|---|---|---|---|---|---|
| 3 | −71.80452 | 2.00000 | 1.905250 | 35.04 | 0.5848 | 45.724 | −105.943 |
| 4 | −283.85406 | 3.58328 | 1.000000 | 0.00 | 0.0000 | 47.807 | 0.000 |
| 5 | 348.54019 | 6.01156 | 1.846660 | 23.78 | 0.6205 | 51.729 | 120.439 |
| 6 | −145.00543 | 2.39757 | 1.000000 | 0.00 | 0.0000 | 52.500 | 0.000 |
| 7* | 477.99140 | 4.33759 | 1.603001 | 65.44 | 0.5401 | 53.705 | 205.487 |
| 8 | −167.51918 | 8.15174 | 1.000000 | 0.00 | 0.0000 | 53.862 | 0.000 |
| 9 | 126.04168 | 1.50000 | 1.805181 | 25.42 | 0.6161 | 54.169 | −120.586 |
| 10 | 54.83663 | 10.33425 | 1.438750 | 94.66 | 0.5340 | 53.726 | 103.278 |
| 11 | −249.50526 | 0.20000 | 1.000000 | 0.00 | 0.0000 | 54.086 | 0.000 |
| 12 | 117.75694 | 10.33425 | 1.755000 | 52.32 | 0.5474 | 55.006 | 74.961 |
| 13* | −105.76402 | (Variable) | 1.000000 | 0.00 | 0.0000 | 55.013 | 0.000 |
| 14 | −720.39137 | 1.25000 | 1.537750 | 74.70 | 0.5392 | 27.212 | −65.731 |
| 15 | 37.31836 | 5.08509 | 1.000000 | 0.00 | 0.0000 | 25.235 | 0.000 |
| 16 | −39.74822 | 1.25000 | 1.834810 | 42.74 | 0.5648 | 25.244 | −52.280 |
| 17 | −427.60077 | 0.15124 | 1.000000 | 0.00 | 0.0000 | 26.200 | 0.000 |
| 18 | 469.47906 | 3.02721 | 1.858956 | 22.73 | 0.6284 | 26.482 | 67.126 |
| 19 | −66.30713 | 1.25000 | 1.804000 | 46.53 | 0.5577 | 26.844 | −305.237 |
| 20 | −91.44834 | (Variable) | 1.000000 | 0.00 | 0.0000 | 27.230 | 0.000 |
| 21 | (Diaphragm) | (Variable) | 1.000000 | 0.00 | 0.0000 | 27.795 | 0.000 |
| 22 | −126.38159 | 1.40000 | 1.487490 | 70.23 | 0.5300 | 28.028 | −143.424 |
| 23 | 158.26586 | (Variable) | 1.000000 | 0.00 | 0.0000 | 28.601 | 0.000 |
| 24 | 50.88588 | 1.30000 | 1.720467 | 34.71 | 0.5834 | 32.054 | −209.131 |
| 25 | 37.69504 | 5.55747 | 1.639999 | 60.08 | 0.5370 | 31.951 | 49.749 |
| 26* | −198.19327 | (Variable) | 1.000000 | 0.00 | 0.0000 | 31.949 | 0.000 |
| 27 | 126.14835 | 5.36134 | 1.496999 | 81.54 | 0.5375 | 35.539 | 91.179 |
| 28 | −70.04065 | 0.16580 | 1.000000 | 0.00 | 0.0000 | 35.787 | 0.000 |
| 29 | 33.31496 | 1.30000 | 2.001000 | 29.14 | 0.5997 | 35.384 | −236.366 |
| 30 | 28.65911 | 8.31543 | 1.438750 | 94.66 | 0.5340 | 34.206 | 69.535 |
| 31 | 414.66565 | 5.78064 | 1.000000 | 0.00 | 0.0000 | 33.228 | 0.000 |
| 32 | 59.92686 | 4.00000 | 2.050900 | 26.94 | 0.6054 | 29.994 | 93.160 |
| 33 | 147.17020 | 3.05378 | 1.000000 | 0.00 | 0.0000 | 28.655 | 0.000 |
| 34 | −74.05040 | 1.10000 | 2.050900 | 26.94 | 0.6054 | 27.817 | −17.967 |
| 35 | 25.83934 | 3.27150 | 1.589130 | 61.14 | 0.5407 | 26.857 | 144.982 |
| 36 | 35.24419 | 1.81511 | 1.000000 | 0.00 | 0.0000 | 27.210 | 0.000 |
| 37 | 34.12369 | 7.78305 | 1.487490 | 70.23 | 0.5300 | 29.344 | 44.064 |
| 38 | −54.12850 | 0.00000 | 1.000000 | 0.00 | 0.0000 | 29.779 | 0.000 |
| Image Plane | ∞ | | | | | | |

ASPHERIC DATA

1st Surface

K = 0.00000e+000 A 4 = 2.53228e−006 A 6 = 3.11085e−009 A 8 = −1.92875e−011
A10 = 5.08445e−014 A12 = −7.31505e−017 A14 = 5.42530e−020 A16 = −1.61062e−023

7th Surface

K = 0.00000e+000 A 4 = −7.36262e−007 A 6 = 6.95119e−010 A 8 = −5.95349e−012
A10 = 3.057516−014 A12 = −6.95113e−017 A14 = 7.57961e−020 A16 = −3.17589e−023

13rd Surface

K = 0.00000e+000 A 4 = −1.589006−007 A 6 =−5.279796−011 A 8 = 3.76780e−013
A10 = −8.86857e−016 A12 = 1.69703e−018 A14 = −1.97977e−021 A16 = 9.44234e−025

26th Surface

K = 0.00000e+000 A 4 = 2.65410e−006 A 6 = −8.03548e−009 A 8 = 2.30353e−010
A10 = −2.89085e−012 A12 = 1.81329e−014 A14 = −5.51462e−017 A16 = 6.46489e−020

VARIOUS DATA
ZOOM RATIO 3.00

| Focal Length: | 18.00 | 27.00 | 37.50 | 53.99 |
|---|---|---|---|---|
| Fno: | 2.20 | 2.20 | 2.20 | 2.20 |
| Half Angle of View (°): | 39.43 | 28.69 | 21.50 | 15.33 |
| Overall Lens Length: | 232.60 | 232.60 | 232.60 | 232.60 |
| BF: | 25.00 | 25.00 | 25.00 | 25.00 |
| d13 | 0.97 | 34.34 | 53.74 | 69.45 |
| d20 | 14.39 | 2.07 | 1.98 | 1.91 |
| d21 | 1.54 | 1.89 | 2.00 | 1.99 |
| d23 | 17.88 | 17.96 | 12.11 | 1.88 |
| d26 | 43.41 | 21.91 | 8.35 | 2.94 |

Lens Unit Data

| Lens Unit | Starting Surface | Focal Length |
|---|---|---|
| 1 | 1 | 66.05 |
| 2 | 14 | −44.99 |

| UNIT: mm | | |
|---|---|---|
| 3 | 21 | (Diaphragm) |
| 4 | 22 | −143.42 |
| 5 | 24 | 65.98 |
| 6 | 27 | 72.49 |

TABLE 1

| | Inequality | Numerical Example | | | | | |
|---|---|---|---|---|---|---|---|
| | | 1 | 2 | 3 | 4 | 5 | 6 |
| (1) | Lwt/Td | 0.051 | 0.066 | 0.046 | 0.061 | 0.142 | 0.241 |
| (2) | (θ m1 − θ m2)/(ν m2 − ν m1) | $0.57 \times 10^{-3}$ | $1.00 \times 10^{-3}$ | $0.82 \times 10^{-3}$ | $1.88 \times 10^{-3}$ | $1.26 \times 10^{-3}$ | $0.60 \times 10^{-3}$ |
| (3) | Dm12/fm1 | 0.115 | 0.215 | 0.368 | 0.108 | 0.316 | 0.272 |
| (4) | fm2/fm1 | −2.33 | −1.95 | −1.03 | −4.61 | −0.89 | −2.17 |
| (5) | ν m1u | 46.58 | 29.14 | — | 55.53 | 58.55 | — |
| (6) | θ m1u | 0.5573 | 0.5997 | — | 0.5434 | 0.5425 | — |
| (7) | ν m2u | 81.54 | 94.66 | — | — | — | 70.23 |
| (8) | θ m2u | 0.5375 | 0.5340 | — | — | — | 0.5300 |
| (9) | |1/β m1| | 0.029 | 0.030 | 0.036 | 0.104 | 0.129 | 0.140 |
| (10) | f1/fn | −1.37 | −2.81 | −1.56 | −1.01 | −1.90 | −1.47 |
| (11) | fm1/fn | −2.05 | −1.69 | −2.25 | −1.59 | −1.84 | −1.47 |
| (12) | (β nt/β nw)/Zwt | 1.000 | 1.107 | 2.980 | 1.041 | 3.018 | 1.357 |
| (13) | (θ np − θ nn)/(ν nn − ν np) | $2.33 \times 10^{-3}$ | $2.10 \times 10^{-3}$ | $1.41 \times 10^{-3}$ | $1.62 \times 10^{-3}$ | $1.54 \times 10^{-3}$ | $2.33 \times 10^{-3}$ |
| | Lwt | 14.592 | 18.951 | 13.502 | 13.987 | 44.857 | 56.010 |
| | Td | 284.118 | 285.784 | 290.620 | 230.160 | 315.008 | 232.602 |
| | β nw | −0.509 | −0.528 | −0.347 | −0.593 | −0.430 | −0.495 |
| | β nt | −1.272 | −1.754 | −14.122 | −1.134 | −10.883 | −2.015 |
| | Dm12 | 7.880 | 13.870 | 16.789 | 7.006 | 18.873 | 17.959 |
| | θ np | 0.6284 | 0.6205 | 0.6030 | 0.5589 | 0.6122 | 0.6284 |
| | θ nn | 0.5539 | 0.5590 | 0.5670 | 0.5997 | 0.5425 | 0.5539 |
| | ν np | 22.73 | 23.78 | 29.30 | 29.14 | 24.80 | 22.73 |
| | ν nn | 54.66 | 53.05 | 54.85 | 48.49 | 70.06 | 54.66 |

Figure 21:
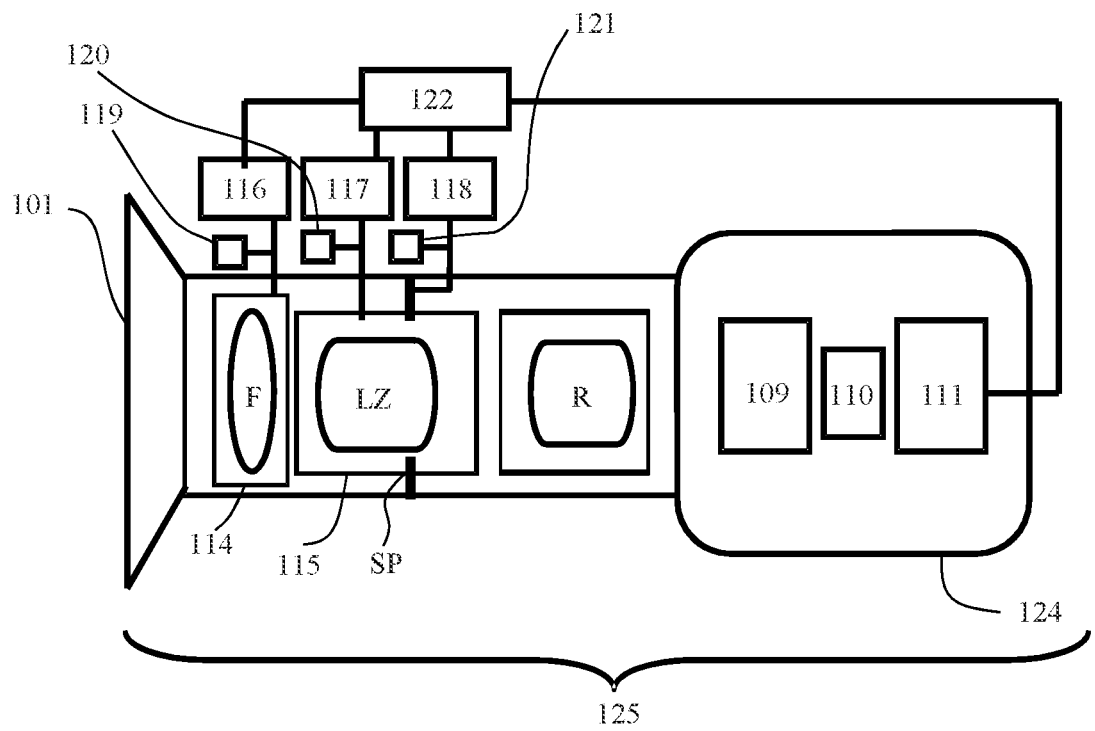
FIG. 21 illustrates an image pickup apparatus that includes the zoom lens according to one of the above examples.

FIG. 21 illustrates a configuration of an image pickup apparatus (television camera system) 125 using any one of the above zoom lenses according to Examples 1 to 6 as an imaging optical system. In FIG. 21, reference numeral 101 denotes the zoom lens according to any one of Examples 1 to 6. Reference numeral 124 denotes a camera. The zoom lens 101 is attachable to and detachable from the camera 124.

The zoom lens 101 includes a first lens unit F, a zooming unit LZ included in the subsequent unit, and a rear unit R used for imaging. The first lens unit F is a lens unit that is moved during focusing. The zooming unit LZ includes a plurality of lens units that are moved during zooming. The diaphragm SP is moved during zooming. Reference numerals 114 and 115 denote driving mechanisms such as a helicoid and a cam that drive lens units included in the first lens unit F and the zooming unit LZ in the optical axis direction, respectively.

Reference numerals 116 to 118 denote motors that drive the driving mechanisms 114 and 115 and the diaphragm SP. Reference numerals 119 to 121 denote detectors such as an encoder, a potentiometer, or a photosensor, each of which detects a position of the first lens unit F, the zooming unit LZ, or the diaphragm SP in the optical axis direction, or an aperture diameter of the diaphragm SP.

In the camera 124, reference numeral 109 denotes a glass block corresponding to an optical filter and a color separating optical system, and reference numeral 110 denotes an image sensor (an image pickup element or a photoelectric conversion element, such as a CCD sensor and CMOS sensor, that receives an object image formed by the zoom lens 101. Reference numerals 111 and 122 denote CPUs that control the camera 124 and the zoom lens 101.

Using the zoom lens according to each example in this way can provide an image pickup apparatus having a high optical performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-020779, filed on Feb. 12, 2021, which is hereby incorporated by reference herein in its entirety.

What is claimed is:

1. A zoom lens comprising, in order from an object side to an image side:
   a first lens unit having a positive refractive power; and
   a subsequent unit including a plurality of lens units,
   wherein the first lens unit is configured not to move for zooming,
   wherein a distance between each pair of adjacent lens units changes in zooming,
   wherein the subsequent unit includes, in order from the image side to the object side,
      a lens unit having a positive refractive power and configured not to move for zooming,
      a moving positive lens unit consisting of one or two lenses, having a positive refractive power, and configured to move in zooming, and
      a diaphragm configured to move in zooming, wherein the diaphragm is closer to the object side at the wide-angle end than at the telephoto end, and wherein the following condition is satisfied:

$$0.01 \leq Lwt/Td \leq 0.25$$

where Lwt is a distance on an optical axis between a position of the diaphragm at the wide-angle end and a position of the diaphragm at the telephoto end, and Td is a distance on the optical axis from a surface closest to the object side of the zoom lens to an image plane of the zoom lens at the wide-angle end.

2. The zoom lens according to claim 1, wherein the subsequent unit further includes a moving negative lens unit having a negative refractive power, consisting of one or two lenses, and disposed on the object side of the moving positive lens unit, and wherein the following condition is satisfied:

$$-2.0 \times 10^{-3} \leq (\theta m1 - \theta m2)/(vm2 - vm1) \leq 2.5 \times 10^{-3}$$

where vm1 is an average value of Abbe numbers based on a d-line of optical materials of all positive lenses included in the moving positive lens unit, and θm1 is an average value of partial dispersion ratios of the optical materials of all the positive lenses with respect to a g-line and an F-line, vm2 is an average value of Abbe numbers based on the d-line of optical materials of all negative lenses included in the moving negative lens unit, and θm2 is an average value of partial dispersion ratios of the optical materials of all the negative lenses with respect to the g-line and the F-line.

3. The zoom lens according to claim 2, wherein the following condition is satisfied:

$$0.01 \leq Dm12/fm1 \leq 0.50$$

where Dm12 is a maximum air spacing between the moving positive lens unit and the moving negative lens unit in a zoom range from the wide-angle end to the telephoto end, and fm1 is a focal length of the moving positive lens unit.

4. The zoom lens according to claim 2, wherein the following condition is satisfied:

$$-5.0 \leq fm2/fm1 \leq -0.7$$

where fm1 is a focal length of the moving positive lens unit, and fm2 is a focal length of the moving negative lens unit.

5. The zoom lens according to claim 2. wherein the moving negative lens unit consists of a single negative lens, and the following living conditions are satisfied:

$$60 \leq vm2u \leq 110$$

$$0.520 \leq \theta m2u \leq 0.550$$

where vm2u an Abbe number based on the d-line of an optical material of the single negative lens, and θm2u is a partial dispersion ratio of the optical material of the single negative lens with respect to the g-line and the F-line.

6. The zoom lens according to claim 1, wherein the moving positive lens unit consists of a single positive lens, and the following conditions are satisfied:

$$28 \leq vm1u \leq 60$$

$$0.540 \leq \theta m1u \leq 0.600$$

where vm1u is an Abbe number based on the d-line of an optical material of the single positive lens, and θm1u is a partial dispersion ratio of the optical material of the single positive lens with respect to the g-line and the F-line.

7. The zoom lens according to claim 1, wherein the following condition is satisfied:

$$|1/\beta m1| \leq 0.2$$

where βm1 is a lateral magnification of the moving positive lens unit at the wide-angle end in an in-focus state at infinity.

8. The zoom lens according to claim 1, wherein the subsequent unit includes one or two moving lens units configured to move in zooming and including a negative lens unit, and wherein the following conditions are satisfied:

$$-5.0 \leq f1/fn \leq -0.8$$

$$-2.5 \leq fm1/fn \leq -1.2$$

where fn is a combined focal length of the one or two moving lens units at the wide-angle end in an in-focus state at infinity, f1 is a focal length of the first lens unit, and fm1 is a focal length of the moving positive lees unit.

9. The zoom lens according to claim 8, wherein the following condition is satisfied:

$$0.6 \leq (\beta nt/\beta nw)/Zwt \leq 4.0$$

where βnw and βnt are lateral magnifications of the one or two moving lens units at the wide-angle end and at the telephoto end, respectively, and Zwt is a zoom ratio of the zoom lens.

10. The zoom lens according to claim 8, wherein the following condition is satisfied:

$$-1.0 \times 10^{-3} \leq (\theta np - \theta nn)/(vnn - vnp) \leq 3.0 \times 10^{-3}$$

where vnp is an average value of Abbe numbers based on a d-line of optical materials of all positive lenses in the negative lens unit included in the one or two moving lens units, vnn is an average value of Abbe numbers based on the d-line of optical materials of all negative lenses in the negative lens unit included in the one or two moving lens units. θnp is an average value of partial dispersion ratios of the optical materials of all the positive lenses in the negative lens unit included in the one or two moving lens units with respect to a g-line and an F-line, and θnn is an average value of partial dispersion ratios of the optical materials of all the negative lenses in the negative lens unit included in the one or two moving lens units with respect to the g-line and the F-line.

11. The zoom lens according to claim 1, wherein the diaphragm is configured to move in zooming with the moving positive lens unit.

12. The zoom lens according to claim 1, wherein the diaphragm is configured to move in zooming, a distance between the diaphragm and the moving positive lens changing in zooming.

13. The zoom lens according to claim 12, wherein the diaphragm is configured to move in zooming with a moving lens unit disposed on the object side of the moving positive lens unit and configured to move in zooming.

14. An image pickup apparatus comprising:
a zoom lens; and
an image pickup element configured to pick up an image formed by the zoom lens,
wherein a zoom lens includes, in order from an object side to an image side:
a first lens unit having a positive refractive power; and
a subsequent unit including a plurality of lens units,
wherein the first lens unit is configured not to move for zooming,
wherein a distance between each pair of adjacent lens units chages in zooming,
wherein the subsequent unit includes, in order from the image side to the object side, a lens unit having a positive refractive power and configured not to move for zooming, a moving positive lens unit consisting of one or two lenses having a positive refractive power, and configured to move in zooming, and a diaphragm configured to move in zooming, wherein the diaphragm is closer to the object side at the wide-angle end than at the telephoto end, and wherein the following condition is satisfied:

$$0.01 \leq Lwt/Td \leq 0.25$$

where Lwt is a distance on an optical axis between a position of the diaphragm at the wide-angle end and a position of the diaphragm at the telephoto end, and Td is a distance on the optical axis from a surface closest to the object side of the zoom lens to an image plane of the zoom lens at the wide-angle end.

* * * * *